United States Patent
Sadiq et al.

(10) Patent No.: US 10,855,390 B2
(45) Date of Patent: Dec. 1, 2020

(54) SYNCHRONIZATION SIGNAL OPTIMIZATIONS FOR SYMBOL INDEX DETECTION

(71) Applicant: QUALCOMM Incorporated, San Diego, CA (US)

(72) Inventors: Bilal Sadiq, Basking Ridge, NJ (US); Tao Luo, San Diego, CA (US); Juergen Cezanne, Ocean Township, NJ (US); Navid Abedini, Somerset, NJ (US); Krishna Kiran Mukkavilli, San Diego, CA (US); Muhammad Nazmul Islam, Littleton, MA (US); Sundar Subramanian, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/211,207

(22) Filed: Dec. 5, 2018

(65) Prior Publication Data

US 2019/0109664 A1 Apr. 11, 2019

Related U.S. Application Data

(63) Continuation of application No. 15/270,879, filed on Sep. 20, 2016, now Pat. No. 10,187,169.

(Continued)

(51) Int. Cl.
*H04J 11/00* (2006.01)
*H04L 27/26* (2006.01)
(Continued)

(52) U.S. Cl.
CPC ....... *H04J 11/0073* (2013.01); *H04J 11/0069* (2013.01); *H04L 27/261* (2013.01);
(Continued)

(58) Field of Classification Search
None
See application file for complete search history.

(56) References Cited

U.S. PATENT DOCUMENTS 9,485,060 B2 * 11/2016 Nayeb Nazar ....... H04B 1/7097
2009/0135803 A1 * 5/2009 Luo ...................... H04L 5/0007
370/350

(Continued)

FOREIGN PATENT DOCUMENTS

| CN | 101578809 A | 11/2009 |
| CN | 101689931 A | 3/2010 |
| CN | 104412554 A | 3/2015 |

OTHER PUBLICATIONS

European Search Report—EP19182018—Search Authority—Berlin—dated Oct. 10, 2019.

(Continued)

*Primary Examiner* — Shripal K Khajuria
(74) *Attorney, Agent, or Firm* — Kevin M. Donnelly

(57) ABSTRACT

Methods, systems, and devices for wireless communication are described. Some examples provide for identifying a primary synchronization signal (PSS) sequence of a synchronization subframe, determining, for the synchronization subframe, an extended synchronization signal (ESS) sequence based at least in part on the PSS sequence and transmitting the synchronization subframe. Other examples provide for generating an ESS sequence for a synchronization subframe to be communicated to a UE, scrambling the ESS sequence based at least in part on cell-specific information associated with the base station and transmitting, to the UE, the scrambled ESS sequence in the synchronization subframe.

21 Claims, 17 Drawing Sheets

Related U.S. Application Data

(60) Provisional application No. 62/313,110, filed on Mar. 24, 2016, provisional application No. 62/315,659, filed on Mar. 30, 2016, provisional application No. 62/317,492, filed on Apr. 1, 2016, provisional application No. 62/324,873, filed on Apr. 19, 2016.

(51) Int. Cl.
*H04W 56/00* (2009.01)
*H04L 25/03* (2006.01)

(52) U.S. Cl.
CPC ....... *H04L 27/2675* (2013.01); *H04W 56/001* (2013.01); *H04L 25/03866* (2013.01)

(56) References Cited

U.S. PATENT DOCUMENTS

| | | | |
|---|---|---|---|
| 2009/0201821 A1* | 8/2009 | Barnette | H04L 12/66 370/245 |
| 2009/0201924 A1 | 8/2009 | Rock et al. | |
| 2013/0016692 A1* | 1/2013 | Chen | H04L 5/0053 370/330 |
| 2014/0105165 A1* | 4/2014 | Dinan | H04W 72/1289 370/329 |
| 2014/0301353 A1* | 10/2014 | Frenne | H04L 27/2613 370/330 |
| 2016/0044667 A1* | 2/2016 | Chen | H04W 72/0446 370/329 |
| 2016/0143027 A1* | 5/2016 | Kim | H04W 72/0426 370/329 |
| 2016/0337159 A1 | 11/2016 | Seo et al. | |
| 2017/0279553 A1 | 9/2017 | Sadiq et al. | |

OTHER PUBLICATIONS

3GPP, "3rd Generation Partnership Project; Technical Specification Group Radio Access Network; Evolved Universal Terrestrial Radio Access (E-UTRA); Physical Channels and Modulation," Release 12, 3GPP TS 36.211 V12.6.0, Jun. 2015, pp. 1-137, XP055369923, Retrieved from the Internet: URL: http://www.etsi.org/deliver/etsi_ts/136200_136299/136211/12.06.00_60/ts_136211v120600p.pdf [retrieved on May 8, 2017].

Cisco, et al., "Verizon 5G TF; Air Interface Working Group; Verizon 5th Generation Radio Access; Physical channels and modulation," Release 1, Jun. 2016, pp. 1-79, XP055318111, Retrieved from the Internet: URL: http://www.5gtf.net/V5G_211_v1p3.pdf[retrieved on Nov. 10, 2016].

International Search Report and Written Opinion—PCT/US2017/019652—ISA/EPO—dated Jun. 6, 2017.

Zahran A.H., et al., "Extended Synchronization Signals for Eliminating PCI Confusion in Heterogeneous LTE," IEEE Wireless Communications and Networking Conference (WCNC), Apr. 2012, pp. 2588-2592, XP055376484, DOI: 10.1109/WCNC.2012.6214236, ISBN: 978-1-4673-0435-1.

Stuhlfauth R., "The road to 5G LTE-A evolution, Internet of Things and first 5G aspects," 2016, 161 pages.

Wassal A.G., et al., "Efficient Implementation of Secondary Synchronization Symbol Detection in 3GPP LTE", IEEE International Symposium on Circuits and Systems (ISCAS), May 18, 2011, pp. 1680-1683.

\* cited by examiner

US 10,855,390 B2

SYNCHRONIZATION SIGNAL OPTIMIZATIONS FOR SYMBOL INDEX DETECTION

CROSS REFERENCES

The present Application for Patent is a Continuation of U.S. patent application Ser. No. 15/270,879 by Sadiq, et al, entitled "Synchronization Signal Optimizations For Symbol Index Detection" filed Sep. 20, 2016, which claims priority to U.S. Provisional Patent Application No. 62/313,110 by Sadiq, et al., entitled "SYNCHRONIZATION SIGNAL OPTIMIZATIONS FOR SYMBOL INDEX DETECTION," filed Mar. 24, 2016, and U.S. Provisional Patent Application No. 62/315,659 by Sadiq, et al., entitled "SYNCHRONIZATION SIGNAL OPTIMIZATIONS FOR SYMBOL INDEX DETECTION," filed Mar. 30, 2016, and U.S. Provisional Application No. 62/317,492 by Sadiq, et al., entitled "SYNCHRONIZATION SIGNAL OPTIMIZATIONS FOR SYMBOL INDEX DETECTION," filed Apr. 1, 2016, and U.S. Provisional Application No. 62/324,873 by Sadiq, et al, entitled "SYNCHRONIZATION SIGNAL OPTIMIZATIONS FOR SYMBOL INDEX DETECTION," filed Apr. 19, 2016, assigned to the assignee hereof.

BACKGROUND

The following relates generally to wireless communication, and more specifically to synchronization signal optimizations for symbol index detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless communications systems may use synchronization signals such as a primary synchronization signal (PSS) and/or a secondary synchronization signal (SSS) to convey information to synchronize various wireless devices in the system. For example, a base station may transmit one or more PSS sequences or SSS sequences to a UE to convey such information. However, such synchronization information may convey information regarding timing at the level of a subframe (e.g., by conveying a subframe index number), but may be inadequate to convey timing information at the level of a symbol index within a particular subframe. In addition, wireless communication systems may use broadcast signals over channels (e.g. a physical broadcast channel (PBCH)) to convey system information to synchronized wireless devices (UEs). This broadcast information may contain an indication of system frame number, and parameters for the device to access the system, for example. A base station may also transmit reference signals to the UE that the wireless devices may use for demodulation of the PBCH. In some examples, the PBCH may be transmitted alongside synchronization signals.

SUMMARY

The described techniques relate to improved methods, systems, devices, or apparatuses that support synchronization signal optimizations for symbol index detection. Generally, the described techniques provide for identifying a primary synchronization signal (PSS) sequence of a synchronization subframe, determining, for the synchronization subframe, an extended synchronization signal (ESS) sequence based on the PSS sequence and transmitting the synchronization subframe. The described techniques also provide, at a base station, for generating an ESS sequence for a synchronization subframe to be communicated to a user equipment (UE), scrambling the ESS sequence based on cell-specific information associated with the base station and transmitting, to the UE, the scrambled ESS sequence in the synchronization subframe. A UE may also receive, from a base station, a scrambled ESS sequence in a synchronization subframe, receive cell-specific information associated with the base station and descramble the scrambled ESS sequence based on the cell-specific information. The described techniques also provide for determining a first ESS sequence for a first synchronization subframe of a frame to be communicated to a UE, the first ESS sequence including a first ESS associated with a symbol index in the first synchronization subframe and generating a second ESS sequence for a second synchronization subframe of the frame, the second ESS sequence including, in the second synchronization subframe, a second ESS associated with the symbol index, where the first ESS is different from the second ESS. Still other described techniques provide for identifying an ESS root index used by the plurality of base stations to generate an ESS sequence at each of the plurality of base stations, generating the ESS sequence at the base station using the ESS root index and transmitting, to a UE, the ESS sequence in a synchronization subframe.

A method of wireless communication is described. The method may include identifying a PSS sequence of a synchronization subframe, determining, for the synchronization subframe, an ESS sequence based on the PSS sequence and transmitting the synchronization subframe.

An apparatus for wireless communication is described. The apparatus may include means for identifying a PSS sequence of a synchronization subframe, means for determining, for the synchronization subframe, an ESS sequence based on the PSS sequence and means for transmitting the synchronization subframe.

A further apparatus is described. The apparatus may include a processor, memory in electronic communication with the processor, and instructions stored in the memory. The instructions may be operable to cause the processor to identify a PSS sequence of a synchronization subframe, determine, for the synchronization subframe, an ESS sequence based on the PSS sequence and transmit the synchronization subframe.

A non-transitory computer readable medium for wireless communication is described. The non-transitory computer-readable medium may include instructions to cause a processor to identify a PSS sequence of a synchronization subframe, determine, for the synchronization subframe, an ESS sequence based on the PSS sequence and transmit the synchronization subframe.

In some examples of the method, apparatus, or non-transitory computer-readable medium described above, determining the ESS sequence includes: determining the ESS root index based on a PSS root index associated with the PSS sequence. Some examples of the method, apparatus, or non-transitory computer-readable medium described above may further include processes, features, means, or instructions for generating the ESS sequence using the determined ESS root index.

In some examples of the method, apparatus, or non-transitory computer-readable medium described above, determining the ESS root index includes: selecting the ESS root index to have a same value as the PSS root index. In some examples of the method, apparatus, or non-transitory computer-readable medium described above, determining the ESS sequence includes: determining the ESS sequence such that a shift in a correlation peak of the ESS sequence due to carrier frequency offset (CFO) corresponds with a shift in a correlation peak of the PSS sequence.

In some examples of the method, apparatus, or non-transitory computer-readable medium described above, determining the ESS sequence includes: generating a conjugate of the PSS sequence. Some examples of the method, apparatus, or non-transitory computer-readable medium described above may further include processes, features, means, or instructions for determining the ESS sequence to be the conjugate of the PSS sequence.

In some examples of the method, apparatus, or non-transitory computer-readable medium described above, determining the ESS sequence includes: determining the ESS sequence such that a shift in a correlation peak of the ESS sequence due to CFO corresponds with but is in an opposite direction as a shift in a correlation peak of the PSS sequence. In some examples of the method, apparatus, or non-transitory computer-readable medium described above, the ESS sequence includes a Zadoff-Chu sequence.

In some examples of the method, apparatus, or non-transitory computer-readable medium described above, scrambling of the ESS sequence does not vary from symbol to symbol within a synchronization subframe. In some examples of the method, apparatus, or non-transitory computer-readable medium described above, the ESS sequence is scrambled with a cell-specific scrambling sequence that is identical for all symbols of a synchronization subframe.

A method of wireless communication is described. The method may include generating a first ESS sequence for a first synchronization subframe to be communicated to a UE, scrambling the first ESS sequence based on cell-specific information associated with the base station and transmitting, to the UE, the scrambled first ESS sequence in the first synchronization subframe.

Some examples of the method described above may further include processes, features, means, or instructions for generating a second ESS sequence for a second synchronization subframe to be communicated to a UE. Some examples of the method described above may further include processes, features, means, or instructions for scrambling the second ESS sequence based at least in part on cell-specific information associated with the base station. Some examples of the method described above may further include processes, features, means, or instructions for transmitting, to the UE, the scrambled second ESS sequence in the second synchronization subframe, wherein the scrambled first ESS sequence may be different from the scrambled second ESS sequence.

An apparatus for wireless communication is described. The apparatus may include means for generating an ESS sequence for a synchronization subframe to be communicated to a UE, means for scrambling the ESS sequence based on cell-specific information associated with the base station and means for transmitting, to the UE, the scrambled ESS sequence in the synchronization subframe.

A further apparatus is described. The apparatus may include a processor, memory in electronic communication with the processor, and instructions stored in the memory. The instructions may be operable to cause the processor to generate an ESS sequence for a synchronization subframe to be communicated to a UE, scramble the ESS sequence based on cell-specific information associated with the base station and transmit, to the UE, the scrambled ESS sequence in the synchronization subframe.

A non-transitory computer readable medium for wireless communication is described. The non-transitory computer-readable medium may include instructions to cause a processor to generate an ESS sequence for a synchronization subframe to be communicated to a UE, scramble the ESS sequence based on cell-specific information associated with the base station and transmit, to the UE, the scrambled ESS sequence in the synchronization subframe.

In some examples of the method, apparatus, or non-transitory computer-readable medium described above, the cell-specific information includes a cell ID or virtual cell ID of the base station. In some examples of the method, apparatus, or non-transitory computer-readable medium described above, the ESS sequence includes a Zadoff-Chu sequence. In some examples of the method, apparatus, or non-transitory computer-readable medium described above, the ESS sequence has a length N and is based on a Zadoff-Chu sequence of prime length $N_{zc}$. Some examples of the method, apparatus, or non-transitory computer-readable medium described above may further include processes, features, means, or instructions for cyclically extending the Zadoff-Chu sequence of prime length $N_{zc}$ to obtain the ESS sequence of length N. Some examples of the method, apparatus, or non-transitory computer-readable medium described above may further include processes, features, means, or instructions for truncating the Zadoff-Chu sequence of prime length $N_{zc}$ to obtain the ESS sequence of length N. Some examples of the method, apparatus, or non-transitory computer-readable medium described above may further include processes, features, means, or instructions for selecting a root of the Zadoff-Chu sequence based on the cell-specific information associated with the base station. In some examples of the method, apparatus, or non-transitory computer-readable medium described above, the scrambling the ESS sequence based on cell-specific information associated with the base station is performed using the sequence defined by $$r(n) = \frac{1}{\sqrt{2}}(1 - 2 \cdot c(2n)) + j\frac{1}{\sqrt{2}}(1 - 2 \cdot c(2n+1)),$$
$$n = 0, 1, \ldots, N-1$$

where N represents the ESS sequence length and (c(i), i=0, . . . ,2N+1) represents a pseudo-random sequence generated using at least the cell ID of the base station. In some examples, the pseudo-random sequence is obtained by initializing a pseudo-random sequence generator with $c_{init}=2^{10} \cdot (7 \cdot (n_s+1)+1) \cdot (2 \cdot N_{ID}^{cell}+1)+2 \cdot N_{ID}^{cell}+1$ or with $c_{init}=2^{10} \cdot (n_s+1) \cdot (2 \cdot N_{ID}^{cell}+1)+2 \cdot N_{ID}^{cell}+1$ where $N_{ID}^{cell}$ represents the cell ID of the base station and $n_s$ is a value that is based on the synchronization subframe. In one example, $n_s$ is 0. In one example, $n_s$ is 0 or 1. In another example, $n_s$ is 0 in the first synchronization subframe and $n_s$ is 25 in the second synchronization subframe.

A method of wireless communication is described. The method may include receiving, from a base station, a scrambled ESS sequence in a synchronization subframe, receiving cell-specific information associated with the base station and descrambling the scrambled ESS sequence based on the cell-specific information.

An apparatus for wireless communication is described. The apparatus may include means for receiving, from a base station, a scrambled ESS sequence in a synchronization subframe, means for receiving cell-specific information associated with the base station and means for descrambling the scrambled ESS sequence based on the cell-specific information.

A further apparatus is described. The apparatus may include a processor, memory in electronic communication with the processor, and instructions stored in the memory. The instructions may be operable to cause the processor to receive, from a base station, a scrambled ESS sequence in a synchronization subframe, receive cell-specific information associated with the base station and descramble the scrambled ESS sequence based on the cell-specific information.

A non-transitory computer readable medium for wireless communication is described. The non-transitory computer-readable medium may include instructions to cause a processor to receive, from a base station, a scrambled ESS sequence in a synchronization subframe, receive cell-specific information associated with the base station and descramble the scrambled ESS sequence based on the cell-specific information.

In some examples of the method, apparatus, or non-transitory computer-readable medium described above, the cell-specific information includes a cell ID or virtual cell ID of the base station. Some examples of the method described above may further include processes, features, means, or instructions for verifying cell-specific information associated with the base station based at least in part on the descrambling. Some examples of the method described above may further include processes, features, means, or instructions for identifying a subframe index value for the first synchronization subframe based at least in part on the descrambling.

Some examples of the method described above may further include processes, features, means, or instructions for receiving, from a base station, a second scrambled extended synchronization signal (ESS) sequence in a second synchronization subframe. Some examples of the method described above may further include processes, features, means, or instructions for descrambling the second scrambled ESS sequence based at least in part on the cell-specific information. Some examples of the method described above may further include processes, features, means, or instructions for verifying a frame boundary based at least in part on the difference between the first synchronization subframe and the second synchronization subframe.

Some examples of the method, apparatus, or non-transitory computer-readable medium described above may further include processes, features, means, or instructions for receiving, from a second base station, a third scrambled ESS sequence. Some examples of the method, apparatus, or non-transitory computer-readable medium described above may further include processes, features, means, or instructions for determining that an attempt to descramble the third scrambled ESS sequence based on the cell-specific information has failed.

A method of wireless communication is described. The method may include determining a first ESS sequence for a first synchronization subframe of a frame to be communicated to a UE, the first ESS sequence including a first ESS associated with a symbol index in the first synchronization subframe and generating a second ESS sequence for a second synchronization subframe of the frame, the second ESS sequence including, in the second synchronization subframe, a second ESS associated with the symbol index, where the first ESS is different from the second ESS.

An apparatus for wireless communication is described. The apparatus may include means for determining a first ESS sequence for a first synchronization subframe of a frame to be communicated to a UE, the first ESS sequence including a first ESS associated with a symbol index in the first synchronization subframe and means for generating a second ESS sequence for a second synchronization subframe of the frame, the second ESS sequence including, in the second synchronization subframe, a second ESS associated with the symbol index, where the first ESS is different from the second ESS.

A further apparatus is described. The apparatus may include a processor, memory in electronic communication with the processor, and instructions stored in the memory. The instructions may be operable to cause the processor to determine a first ESS sequence for a first synchronization subframe of a frame to be communicated to a UE, the first ESS sequence including a first ESS associated with a symbol index in the first synchronization subframe and generate a second ESS sequence for a second synchronization subframe of the frame, the second ESS sequence including, in the second synchronization subframe, a second ESS associated with the symbol index, where the first ESS is different from the second ESS.

A non-transitory computer readable medium for wireless communication is described. The non-transitory computer-readable medium may include instructions to cause a processor to determine a first ESS sequence for a first synchronization subframe of a frame to be communicated to a UE, the first ESS sequence including a first ESS associated with a symbol index in the first synchronization subframe and generate a second ESS sequence for a second synchronization subframe of the frame, the second ESS sequence including, in the second synchronization subframe, a second ESS associated with the symbol index, where the first ESS is different from the second ESS.

In some examples of the method, apparatus, or non-transitory computer-readable medium described above, determining the first ESS sequence includes: applying a first cyclic shift to a PSS sequence. In some examples of the method, apparatus, or non-transitory computer-readable medium described above, generating the second ESS sequence includes: applying a second cyclic shift to the PSS sequence.

In some examples of the method, apparatus, or non-transitory computer-readable medium described above, the PSS sequence includes a Zadoff-Chu sequence. In some examples of the method, apparatus, or non-transitory computer-readable medium described above, generating the second ESS sequence includes: applying a cyclic shift to the first ESS sequence to generate the second ESS sequence.

In some examples of the method, apparatus, or non-transitory computer-readable medium described above, the first ESS associated with the symbol index of the first synchronization subframe includes a first sequence $$(d((n+\Delta_{shift})\bmod N), n=0,1,\ldots N-1)$$

and the second ESS associated with the symbol index of the second synchronization subframe includes a second sequence $$(d((n+\Delta_{shift}(l+\theta) \bmod N_{symb})) \bmod N), n=0,1,\ldots N-1)$$

where θ represents a fixed offset, $\Delta_{shift}$ represents the step-size of cyclic shift, N represents the ESS sequence length, (d(n), n=0,1, . . . , N) represents the sequence that is cyclically shifted to obtain ESS, l represents the symbol index, and $N_{symb}$ represents the number of symbols (such as OFDM symbols) in time in the first synchronization subframe. In some examples of the method, apparatus, or non-transitory computer-readable medium described above, θ is seven (7). In some examples of the method, apparatus, or non-transitory computer-readable medium described above, θ is $$\left\lfloor \frac{N_{symb}}{2} \right\rfloor.$$

In some examples of the method, apparatus, or non-transitory computer-readable medium described above, $N_{symb} = 14$, $N = 63$, $d(n) = e^{-j\frac{\pi rn(n+1)}{N}}$ for fixed $r \in \{25, 29, 34\}$, and $\Delta_{shift} = 4$.

In some examples of the method, apparatus, or non-transitory computer-readable medium described above, the first ESS associated with the symbol index of the first synchronization subframe includes a first sequence $$\left(d\left(\left(n+\left\lfloor\frac{Nl}{N_{symb}}\right\rfloor\right) \bmod N\right), n=0,1,\ldots N-1\right)$$

and the second ESS associated with the symbol index of the second synchronization subframe includes a second sequence $$\left(d\left(\left(n+\left\lfloor\frac{N((l+\theta) \bmod N_{symb})}{N_{symb}}\right\rfloor\right) \bmod N\right), n=0,1,\ldots N-1\right)$$

where θ represents a fixed offset, N represents the ESS sequence length, (d (n), n=0,1, . . . , N) represents the sequence that is cyclically shifted to obtain ESS, l represents the symbol index, and $N_{symb}$ represents the number of symbols (such as OFDM symbols) in time in the first synchronization subframe. In some examples of the method, apparatus, or non-transitory computer-readable medium described above, θ is seven (7). In some examples of the method, apparatus, or non-transitory computer-readable medium described above, θ is $$\left\lfloor \frac{N_{symb}}{2} \right\rfloor.$$

In some examples of the method, apparatus, or non-transitory computer-readable medium described above, $N_{symb} = 14$, $N = 63$, $d(n) = e^{-j\frac{\pi rn(n+1)}{N}}$ for fixed $r \in \{25, 29, 34\}$.

In some examples of the method, apparatus, or non-transitory computer-readable medium described above, the first ESS associated with the symbol index of the first synchronization subframe includes a first sequence $$(d((n+\Delta_{shift}l) \bmod N), n=0,1,\ldots N-1)$$

and the second ESS associated with the symbol index of the second synchronization subframe includes a second sequence $$(d((n+\Delta_{shift}(l+\theta) \bmod N_{symb})) \bmod N), n=0,1,\ldots N-1)$$

where θ represents a fixed offset, $\Delta_{shift}$ represents the step-size of cyclic shift, N represents the ESS sequence length, (d(n), n=0,1, . . . , N) represents the sequence that is cyclically shifted to obtain ESS, and l represents the symbol index. In some examples of the method, apparatus, or non-transitory computer-readable medium described above, θ is seven (7). In some examples of the method, apparatus, or non-transitory computer-readable medium described above, θ is $$\left\lfloor \frac{N_{symb}}{2} \right\rfloor,$$

where $N_{symb}$ represents the number of symbols (such as OFDM symbols) in time in the first synchronization subframe. In some examples of the method, apparatus, or non-transitory computer-readable medium described above, $N_{symb} = 14$, $N = 63$, $d(n) = e^{-j\frac{\pi rn(n+1)}{N}}$ for fixed $r \in \{25, 29, 34\}$, and $\Delta_{shift} = 4$.

In some examples of the method, apparatus, or non-transitory computer-readable medium described above, the first ESS associated with the symbol index of the first synchronization subframe includes a first sequence $$\left(d\left(\left(n+\left\lfloor\frac{Nl}{N_{symb}}\right\rfloor\right) \bmod N\right), n=0,1,\ldots N-1\right)$$

and the second ESS associated with the symbol index of the second synchronization subframe includes a second sequence $$\left(d\left(\left(n+\left\lfloor\frac{N(l+\theta)}{N_{symb}}\right\rfloor\right) \bmod N\right), n=0,1,\ldots N-1\right)$$

where θ represents a fixed offset, N represents the ESS sequence length, (d (n), n=0,1, . . . , N) represents the sequence that is cyclically shifted to obtain ESS, l represents the symbol index, and $N_{symb}$ represents the number of symbols (such as OFDM symbols) in time in the first synchronization subframe. In some examples of the method, apparatus, or non-transitory computer-readable medium described above, θ is seven (7). In some examples of the method, apparatus, or non-transitory computer-readable medium described above, θ is $$\left\lfloor \frac{N_{symb}}{2} \right\rfloor.$$

In some examples of the method, apparatus, or non-transitory computer-readable medium described above, $$N_{symb} = 14,$$
$$N = 63,$$
$$d(n) = e^{-j\frac{\pi rn(n+1)}{N}} \text{ for fixed } r \in \{25, 29, 34\}.$$

In some examples of the method, apparatus, or non-transitory computer-readable medium described above, the first ESS associated with the symbol index of the first synchronization subframe includes a first sequence $$(d((n+\Delta_{shift}l) \bmod N), n=0,1, \ldots N-1)$$

and the second ESS associated with the symbol index of the second synchronization subframe includes a second sequence $$(d((n+\Delta_{shift}l+\phi) \bmod N), n=0,1, \ldots N-1)$$

where φ represents a fixed offset, $\Delta_{shift}$ represents the step-size of cyclic shift, N represents the ESS sequence length, (d(n), n=0,1, . . . , N) represents the sequence that is cyclically shifted to obtain ESS, and l represents the symbol index. In some examples of the method, apparatus, or non-transitory computer-readable medium described above, φ is thirty-two (32). In some examples of the method, apparatus, or non-transitory computer-readable medium described above, φ is twenty-eight (28). In some examples of the method, apparatus, or non-transitory computer-readable medium described above, $$\phi = \left\lfloor \frac{N_{symb}}{2} \right\rfloor \Delta_{shift},$$

where $N_{symb}$ represents the number of symbols (such as OFDM symbols) in time in the first synchronization subframe.

Some examples of the method, apparatus, or non-transitory computer-readable medium described above may further include processes, features, means, or instructions for alternately transmitting, to the UE, the first synchronization subframe of the frame and the second synchronization subframe of the frame.

Some examples of the method, apparatus, or non-transitory computer-readable medium described above may further include processes, features, means, or instructions for transmitting one or more subframes between the first synchronization subframe and the second synchronization subframe.

In some examples of the method, apparatus, or non-transitory computer-readable medium described above, the first synchronization subframe has a subframe index of value zero.

In some examples of the method, apparatus, or non-transitory computer-readable medium described above, the second synchronization subframe has a subframe index of value twenty-five.

Some examples of the method, apparatus, or non-transitory computer-readable medium described above may further include processes, features, means, or instructions for determining a first reference signal (RS) sequence for a physical broadcast channel (PBCH) for the first synchronization subframe, where the first RS sequence includes a first RS associated with the symbol index in the first synchronization subframe, and generating a second RS sequence for a second synchronization subframe of the frame, where the second RS sequence includes, in the second synchronization subframe, a second RS associated with the symbol index.

Some examples of the method, apparatus, or non-transitory computer-readable medium described above may further include processes, features, means, or instructions for determining a first reference signal (RS) for a first physical broadcast channel (PBCH) in a symbol index l of the first synchronization subframe, and determining a second reference signal (RS) for the second PBCH in the symbol index l of the second synchronization subframe, where the first RS is different from the second RS.

A method of wireless communication is described. The method may include identifying an ESS root index used by the plurality of base stations to generate an ESS sequence at each of the plurality of base stations, generating the ESS sequence at the base station using the ESS root index and transmitting, to a UE, the ESS sequence in a synchronization subframe.

An apparatus for wireless communication is described. The apparatus may include means for identifying an ESS root index used by the plurality of base stations to generate an ESS sequence at each of the plurality of base stations, means for generating the ESS sequence at the base station using the ESS root index and means for transmitting, to a UE, the ESS sequence in a synchronization subframe.

A further apparatus is described. The apparatus may include a processor, memory in electronic communication with the processor, and instructions stored in the memory. The instructions may be operable to cause the processor to identify an ESS root index used by the plurality of base stations to generate an ESS sequence at each of the plurality of base stations, generate the ESS sequence at the base station using the ESS root index and transmit, to a UE, the ESS sequence in a synchronization subframe.

A non-transitory computer readable medium for wireless communication is described. The non-transitory computer-readable medium may include instructions to cause a processor to identify an ESS root index used by the set of base stations to generate an ESS sequence at each of the set of base stations, generate the ESS sequence at the base station using the ESS root index and transmit, to a UE, the ESS sequence in a synchronization subframe.

A method of wireless communication is described. The method may include determining a first reference signal (RS) sequence for a physical broadcast channel (PBCH) for the first synchronization subframe of a frame to be communicated to a user equipment (UE), where the first RS sequence includes a first RS associated with a symbol index in the first synchronization subframe, and generating a second RS sequence for a second synchronization subframe of the frame, where the second RS sequence includes, in the second synchronization subframe, a second RS associated with the symbol index, where a first extended synchronization signal (ESS) associated with the first synchronization subframe is different from a second ESS associated with the second synchronization subframe.

An apparatus for wireless communication is described. The apparatus may include means for determining a first reference signal (RS) sequence for a physical broadcast channel (PBCH) for the first synchronization subframe of a frame to be communicated to a user equipment (UE), where the first RS sequence includes a first RS associated with a symbol index in the first synchronization subframe and means for generating a second RS sequence for a second synchronization subframe of the frame, where the second RS sequence includes, in the second synchronization subframe, a second RS associated with the symbol index, where a first extended synchronization signal (ESS) associated with the first synchronization subframe is different from a second ESS associated with the second synchronization subframe.

A further apparatus is described. The apparatus may include a processor, memory in electronic communication with the processor, and instructions stored in the memory. The instructions may be operable to cause the processor determine a first reference signal (RS) sequence for a physical broadcast channel (PBCH) for the first synchronization subframe of a frame to be communicated to a user equipment (UE), where the first RS sequence includes a first RS associated with a symbol index in the first synchronization subframe, and generate a second RS sequence for a second synchronization subframe of the frame, where the second RS sequence includes, in the second synchronization subframe, a second RS associated with the symbol index, where a first extended synchronization signal (ESS) associated with the first synchronization subframe is different from a second ESS associated with the second synchronization subframe.

A non-transitory computer readable medium for wireless communication is described. The non-transitory computer-readable medium may include instructions to cause a processor to determine a first reference signal (RS) sequence for a physical broadcast channel (PBCH) for the first synchronization subframe of a frame to be communicated to a user equipment (UE), where the first RS sequence includes a first RS associated with a symbol index in the first synchronization subframe, and generate a second RS sequence for a second synchronization subframe of the frame, where the second RS sequence includes, in the second synchronization subframe, a second RS associated with the symbol index, where a first extended synchronization signal (ESS) associated with the first synchronization subframe is different from a second ESS associated with the second synchronization subframe.

A method of wireless communication is described. The method may include determining a first reference signal (RS) for a first physical broadcast channel (PBCH) in a symbol index of a first synchronization subframe of a frame to be communicated to a user equipment (UE), and determining a second reference signal (RS) for a second PBCH in the symbol index of a second synchronization subframe of the frame, where the first RS is different from the second RS.

An apparatus for wireless communication is described. The apparatus may include means for determining a first reference signal (RS) for a first physical broadcast channel (PBCH) in a symbol index of a first synchronization subframe of a frame to be communicated to a user equipment (UE), and means for determining a second reference signal (RS) for a second PBCH in the symbol index of a second synchronization subframe of the frame, where the first RS is different from the second RS.

A further apparatus is described. The apparatus may include a processor, memory in electronic communication with the processor, and instructions stored in the memory. The instructions may be operable to cause the processor to determine a first reference signal (RS) for a first physical broadcast channel (PBCH) in a symbol index of a first synchronization subframe of a frame to be communicated to a user equipment (UE), and determine a second reference signal (RS) for a second PBCH in the symbol index of a second synchronization subframe of the frame, where the first RS is different from the second RS.

A non-transitory computer readable medium for wireless communication is described. The non-transitory computer-readable medium may include instructions to cause a processor to determine a first reference signal (RS) for a first physical broadcast channel (PBCH) in a symbol index of a first synchronization subframe of a frame to be communicated to a user equipment (UE), and determine a second reference signal (RS) for a second PBCH in the symbol index of a second synchronization subframe of the frame, where the first RS is different from the second RS.

In some examples of the method, apparatus, or non-transitory computer-readable medium described above, the set of base stations are synchronized.

A method of wireless communication is described. The method may include identifying cell-specific information associated with the base station, generating, based on the identified cell-specific information, an extended synchronization signal (ESS) sequence for a synchronization subframe; and transmitting the ESS sequence in the synchronization subframe to a user equipment (UE).

An apparatus for wireless communication is described. The apparatus may include means for identifying cell-specific information associated with a base station, means for generating, based on the identified cell-specific information, an extended synchronization signal (ESS) sequence for a synchronization subframe, and means for transmitting the ESS sequence in the synchronization subframe to a user equipment (UE).

A further apparatus is described. The apparatus may include a processor, memory in electronic communication with the processor, and instructions stored in the memory. The instructions may be operable to cause the processor to identify cell-specific information associated with a base station, generate, based on the identified cell-specific information, an extended synchronization signal (ESS) sequence for a synchronization subframe, and transmit the ESS sequence in the synchronization subframe to a user equipment (UE).

A non-transitory computer readable medium for wireless communication is described. The non-transitory computer-readable medium may include instructions to cause a processor to identify cell-specific information associated with a base station, generate, based on the identified cell-specific information, an extended synchronization signal (ESS) sequence for a synchronization subframe, and transmit the ESS sequence in the synchronization subframe to a user equipment (UE).

In some examples of the method, apparatus, or non-transitory computer-readable medium described above, the cell-specific information includes a cell identifier (ID) or virtual cell ID of the base station.

DETAILED DESCRIPTION

Synchronization signal optimizations for symbol index detection are described in the present disclosure. In particular, different aspects related to an extended synchronization signal (ESS), which may be transmitted by a base station to one or more user equipments (UEs) in a synchronization subframe, are described. The ESS may convey information regarding the symbol index of a subframe, for example so that in addition to determining the subframe index at the UE for synchronization (e.g. based on a primary synchronization signal (PSS)), the UE may determine the symbol index within the subframe at the UE for more synchronization (e.g. finer synchronization based on an ESS). In some examples, a base station may transmit both a PSS and an ESS in the same synchronization subframe. A PSS sequence and an ESS sequence may each be Zadoff-Chu sequences, generated using the same root index value. In other examples, the PSS sequence may be a Zadoff-Chu sequence, and the ESS may be the conjugate of the PSS sequence. In still other examples, a base station may generate an ESS with cell-specific information such as a cell identification (ID) or a virtual cell ID to reduce ambiguity errors, for example due to multiple synchronization signals received from a neighboring cells that may erroneously pass a symbol index hypothesis. In further examples, multiple different synchronization subframes may be transmitted by a base station, such that an ESS value associated with a particular symbol index in one of the synchronization subframes is different than an ESS value associate with the same symbol index in a second synchronization subframe. In still other examples, for example where a network is synchronized, each cell may transmit the same ESS to increase the possibility of successful detection at a UE (e.g., through constructive interference of the multiple transmitted ESS).

Aspects of the disclosure are initially described in the context of a wireless communication system. Aspects of the disclosure are further illustrated by and described with reference to apparatus diagrams, system diagrams, and flowcharts that relate to synchronization signal optimizations for symbol index detection.

Figure 1:
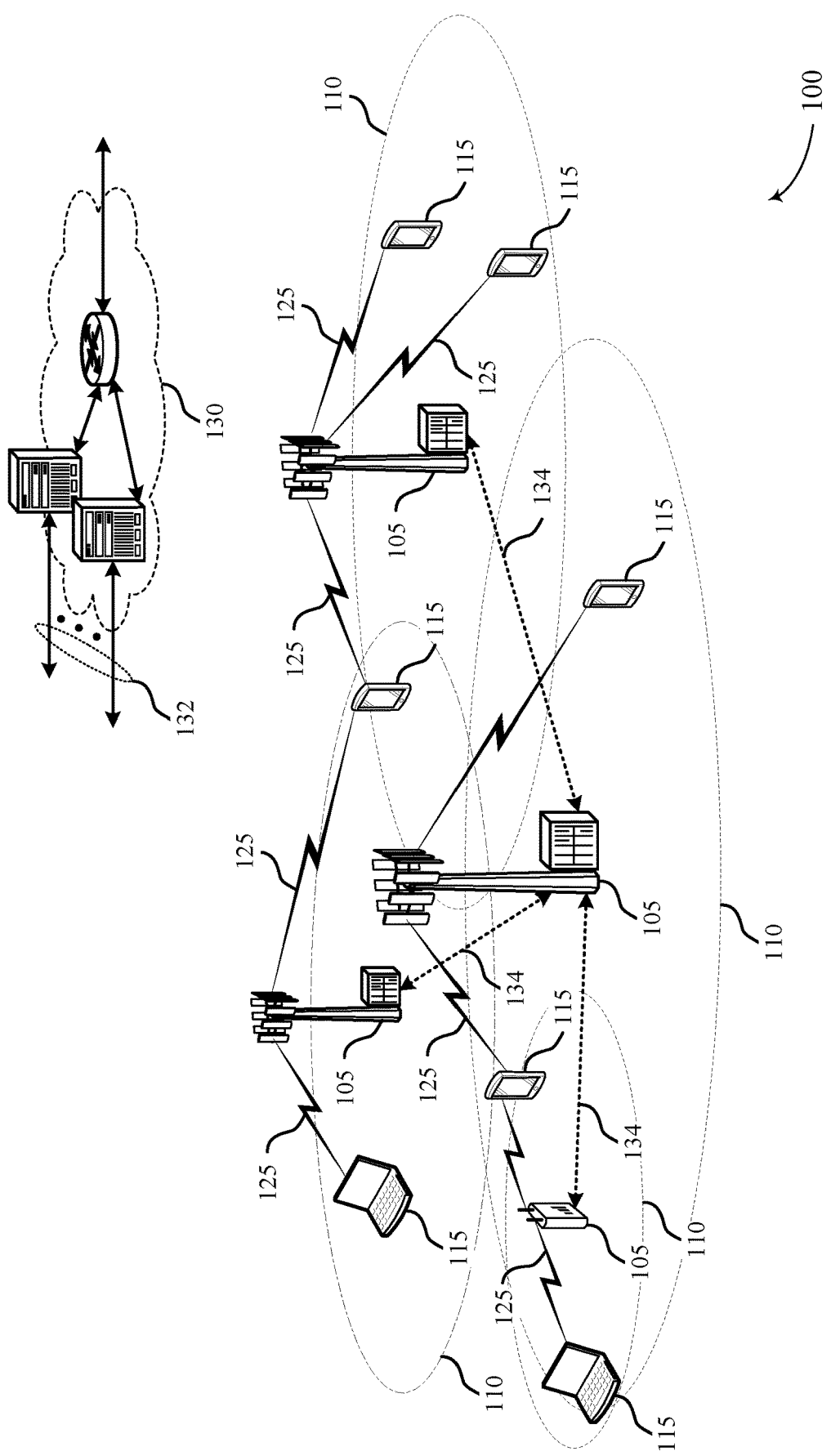
FIG. 1 illustrates an example of a wireless communications system that supports synchronization signal optimizations for symbol index detection in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may receive one or more synchronization signals, including a PSS, a secondary synchronization signal (SSS), and/or an ESS. For example, a UE 115 attempting to access a wireless network may perform an initial cell search by detecting a PSS from a base station 105. A PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The UE 115 may also receive an ESS, for example to convey a symbol index. For example, the ESS may be transmitted alongside other synchronization signals, such as PSS and SSS, that convey time synchronization at different granularity (e.g., subframe and symbols timing) but not necessarily the symbol index. Some systems may transmit one or more of the PSS, SSS, or ESS, but not the others.

After receiving one or more of the synchronization signals, the UE 115 may receive a master information block (MIB), which may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, sounding reference signal (SRS), and/or cell barring.

Figure 2:
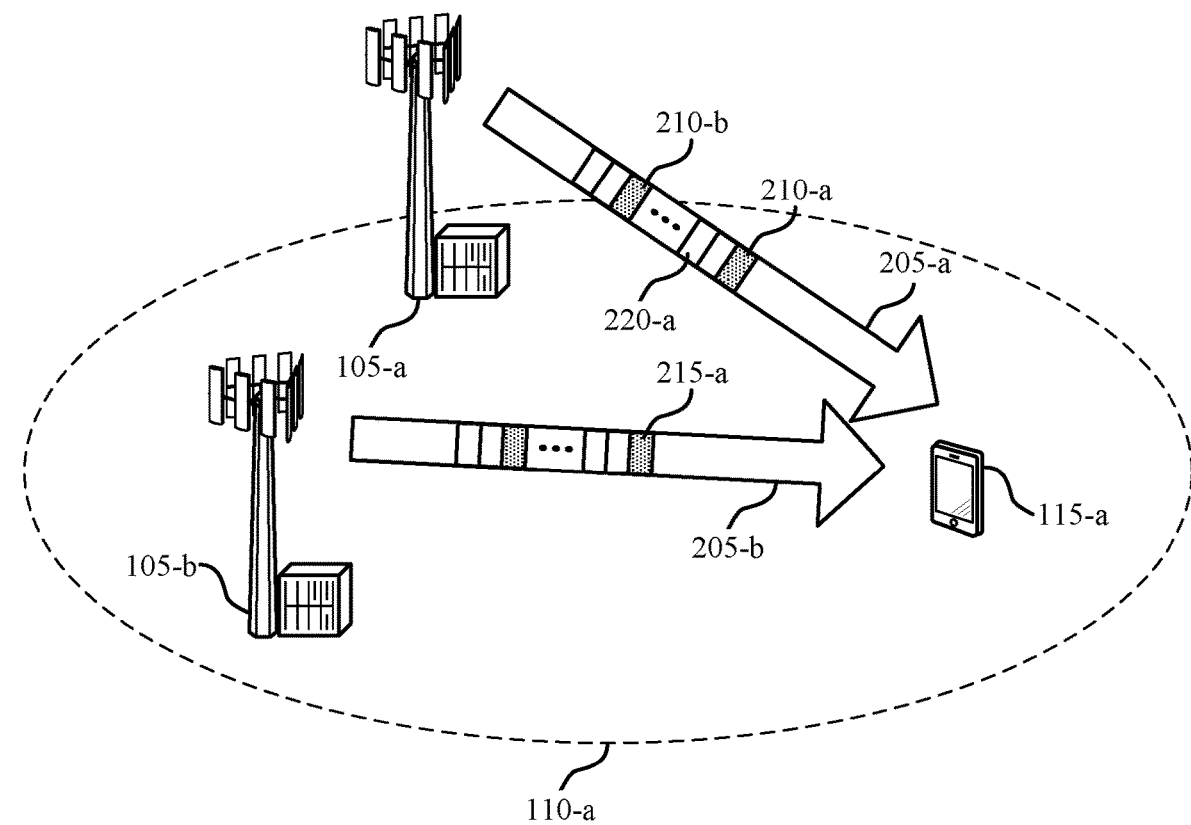
FIG. 2 illustrates an example of a wireless communications system for synchronization signal optimizations for symbol index detection in accordance with aspects of the present disclosure.

FIG. 2 illustrates an example of a wireless communications system 200 for synchronization signal optimizations for symbol index detection. Wireless communications system 200 may include base station 105-*a*, base station 105-*b*, and UE 115-*a*, which may be examples of the corresponding devices described with reference to FIG. 1. Base stations 105 may communicate with wireless devices inside coverage area 110-*a*, including UE 115-*a*.

Base station 105-*a* may communicate with UE 115-*a* using a communication link 205-*a*, which may be an example of communication link 125 described with reference to FIG. 1, and may communicate according to one or more of the communication techniques described with reference to FIG. 1. Base station 105-*a* may transmit to UE 115-*a* using a number of frames, each of which may be each organized into a number of subframes, e.g. subframe 220-*a*. Certain of the subframes may be synchronization subframes 210 that may include one or more synchronization signals, including one or more PSS, SSS, and/or ESS.

The UE 115 may receive a PSS from a base station 105 in a synchronization subframe 210-*a* over communication link 205-*a*. The PSS may enable synchronization of slot timing and may indicate a physical layer identity value (e.g., a physical layer cell Identifier (cell ID)). The PSS may be based on a Zadoff-Chu (ZC) sequence. In some examples of the synchronization subframe, the PSS may be transmitted across each symbol of the synchronization subframe. In some cases, the PSS may be transmitted identically in each symbol. For example, where a subframe is fourteen (14) symbols across in the time-domain, the PSS may be repeated identically across each of the 14 symbols. In other examples, the PSS may be mapped across each of the symbols, but for different resource elements having differing frequency-domain indices.

The UE 115 may also receive an SSS in a synchronization subframe 210-*a* over communication link 205-*a*. The SSS may enable radio frame synchronization, and may provide a cell identity value, which may be combined with the physical layer identity value to identify the cell. The SSS may also enable detection of a duplexing mode and a cyclic prefix length. An SSS sequence may be based on maximum length sequences (e.g., M-sequences). An SSS sequence may be constructed by interleaving, in the frequency-domain, two length-31 Binary Phase Shift Keying (BPSK)-modulated sequences. The two length-31 BPSK-modulated sequences may be two different cyclic shifts of a single length-31 M-sequence. The cyclic shift indices of the M-sequences may be derived from a function of the physical layer cell identity group. In some examples of the synchronization subframe, the SSS may also be transmitted (e.g., identically) across each symbol of the synchronization subframe. For example, where a subframe is fourteen (14) symbols across in the time-domain, the SSS may be repeated identically across each of the 14 symbols. In other examples, the SSS may be mapped across each of the symbols, but for different resource elements having differing frequency-domain indices.

The UE 115 may also receive an ESS in a synchronization subframe 210-*a* over communication link 205-*a*. An ESS may convey one or more symbol indices. In some examples, the ESS may be transmitted alongside other synchronization signals (e.g., a PSS and/or a SSS) that convey time synchronization information at a different granularity than the ESS. For example, other synchronization signals (e.g., PSS and/or SSS) may convey subframe and/or symbol timing information, but not a symbol index as conveyed by the ESS. Thus, if UE 115 receives PSS and SSS, and successfully decodes the PSS and SSS, UE 115 may determine, among other things, a subframe during which the PSS and/or SSS were received, but UE 115 may be unable to determine the symbol index of the subframe associated with the PSS and/or SSS. In some examples of the synchronization subframe, the ESS may be transmitted across each symbol of the synchronization subframe, but having a different value from symbol to symbol to convey the symbol index. For example, where a subframe is fourteen (14) symbols across in the time-domain, the ESS may be different across each of the 14 symbols (e.g., the ESS sequence may convey 14 hypotheses). In some examples, base station 105 may generate an ESS sequence for a synchronization subframe, and cyclically shift the ESS sequence by 14 different amounts to convey 14 different symbol indices. In other examples, the ESS may be mapped across each of the symbols, but for resource elements having differing frequency-domain indices (e.g., different values of k).

In a first example of synchronization signal optimizations for symbol index detection, a base station 105-*a* (or base station 105-*b*) may transmit synchronization signals in a synchronization subframe 210-*a* (or 215-*a*) of a frame, where some or all of the synchronization subframe may be received by UE 115-*a*. Base station 105 may transmit multiple PSSs as described above within the synchronization subframe. In some case, the PSS may be a Zadoff-Chu sequence, or another sequence having zero cyclic autocorrelation at all substantially nonzero lags. Base station 105 may also transmit multiple ESSs as described above within the synchronization subframe. According to this first example, the ESS sequence and the PSS sequence may be generated using the same root value (e.g., the ESS root index may be the same as the PSS root index).

Generating an ESS sequence using the same root index as used to generate the PSS sequence may result in a shift in correlation peak due to carrier frequency offset (CFO) for the PSS and ESS that is the same. As a result of the same CFO, the information coded in the location of the correlation peaks of the ESS (e.g., the symbol index) may be robustly detected in the presence of CFO.

In a second example of synchronization signal optimizations for symbol index detection, a base station 105-*a* (or base station 105-*b*) may transmit synchronization signals in a synchronization subframe 210-*a* (or 215-*a*) of a frame, where some or all of the synchronization subframe may be received by UE 115-*a*. Base station 105 may transmit multiple PSSs and ESSs as described above within the synchronization subframe (e.g., a Zadoff-Chu sequence, or another zero cyclic autocorrelation sequence). According to this second example, the PSS sequence may be generated using a root value. The ESS sequence may then be generated as a conjugate of the PSS sequence. In an example, for each PSS associated with a particular symbol in the synchronization subframe, the ESS associated with that same symbol may be the conjugate of the PSS.

Generating the ESS as the conjugate of the PSS may shift the correlation peak of the PSS and the correlation peak of the ESS in opposite directions, and may be used to estimate a CFO. In some examples, small scale shifts within 1/N of the symbol duration (where N represents the total number of symbols), alongside a shift in opposite direction in PSS peak, may convey the CFO. A large-scale shift in the correlation peak of the ESS (e.g. larger than 1/N) may convey the symbol index.

In a third example of synchronization signal optimizations for symbol index detection, a base station 105-a (or base station 105-b) may transmit synchronization signals, including an ESS sequence, in a synchronization subframe 210-a (or 215-a) of a frame, where some or all of the synchronization subframes may be received by UE 115-a. The base station 105-a may determine an ESS sequence, then scramble the ESS sequence prior to transmission to UE 115-a. In some examples, the ESS may be scrambled based on cell-specific information, for example a cell identifier (cell ID) or virtual cell identifier (virtual cell ID). UE 115-a may receive the scrambled ESS sequence in the synchronization subframe and be able to successfully decode the scrambled ESS sequence using the same cell-specific information (e.g., the cell ID or virtual cell ID). In some examples, the base station 105-a may convey the cell-specific information to UE 115-a prior to the scrambled ESS sequence, such that UE 115-a may be able to descramble the scrambled ESS sequence. Further, UE 115-a may use the scrambled ESS sequence in the synchronization subframe to verify the cell-specific information.

Some advantages of transmitting a scrambled ESS in a synchronization subframe may include reducing base station ambiguity. For example, base station 105-a may transmit a synchronization subframe 210-a including a scrambled ESS sequence scrambled with the cell ID or virtual cell ID associated with base station 105-a. Similarly, base station 105-b may transmit a synchronization subframe 215-a that includes a scrambled ESS sequence scrambled with the cell ID or virtual cell ID associated with base station 105-b. The UE 115-a, having already decoded the cell-specific information (e.g., cell ID or virtual cell ID) associated with base station 105-a, the correct base station, may attempt to and successfully descramble the scrambled ESS sequence. The UE 115-a may also receive the scrambled ESS sequence in synchronization subframe 210-b. However, UE 115-a may attempt to descramble the scrambled ESS sequence from base station 105-b, but may fail to do so because UE 115-a is attempting to descramble using incorrect cell-specific information (e.g. cell-specific information associated with the neighboring base station). Such scrambling according to cell-specific information (e.g., associated with a transmitting base station), may be particularly beneficial (e.g., to reduce ambiguity errors for ESS received from neighboring cells) in asynchronous or quasi-synchronous deployments. Such scrambling may also be beneficial in synchronous networks or deployments where interference from neighboring cells that are farther from a nearby cell (e.g., a serving cell) may cause a symbol index hypothesis to wrongly pass (e.g., due to propagation delay from the farther neighboring cell).

In some examples, the ESS sequence generated by the base station 105-b may be or include a Zadoff-Chu sequence. In other examples, the ESS sequence generated by the base station 105-b may be a sequence of length N. The ESS sequence of length N may be obtained by a cyclic extension of a Zadoff-Chu sequence having a prime length $N_{zc}$ (e.g., for $N>N_{zc}$. For example, N may have a value of 63, and $N_{zc}$ may have a value of 61 (or another prime number). In some examples, the ESS sequence of length N may be obtained by truncation of a Zadoff-Chu sequence having a prime length $N_{zc}$ (e.g., for $N<N_{zc}$). For example, N may have a value of 63, and $N_{zc}$ may have a value of 67 (or another prime number). Base station 105-b may select a root of the Zadoff-Chu sequence based on the cell-specific information associated with base station 105-b (e.g., the cell ID or virtual cell ID associated with base station 105-b). If the sequence length is prime, the Zadoff-Chu sequences corresponding to two different roots may have low cross-correlation. In some circumstances, the cross-correlation may be $\sqrt{N_{zc}}$. Therefore, ESS sequences from two cells that use different roots may have low cross-correlation and thus a lower chance of ESS misdetection than if the length of the Zadoff-Chu sequences were not prime (e.g., because the ESS sequences corresponding to two different non-prime roots may have a relatively larger cross-correlation). In some examples, Zadoff-Chu sequences having non-prime roots may warrant a careful selection of sequence roots in order to have a similarly low cross-correlation as Zadoff-Chu sequences having prime lengths. Moreover, depending on the ESS sequence length, there may be a limited set of roots available that exhibit such low cross-correlation, making cell planning difficult. Thus, in some examples, the use of ESS sequences based on Zadoff-Chu sequences having prime roots may make cell planning easier, including for base station 105-b, because neighboring cells may be allocated ESS sequences that have low cross-correlation.

In some examples, scrambling the ESS sequence based on cell-specific information associated with the base station is performed using the sequence defined by Eq. 1:

$$r(n) = \frac{1}{\sqrt{2}}(1 - 2 \cdot c(2n)) + j\frac{1}{\sqrt{2}}(1 - 2 \cdot c(2n+1)), \quad (1)$$

$$n = 0, 1, \ldots, N-1$$

where N represents the ESS sequence length and (c(i), i=0, . . . , 2N+1) represents a pseudo-random sequence generated using at least the cell ID of the base station. In some examples, the pseudo-random sequence may be obtained by initializing a pseudo-random sequence generator (e.g., a pseudo-random sequence generator also used for a cell-specific reference signal (CRS), e.g. a length-31 Gold sequence) with $c_{init}=2^{10} \cdot (7 \cdot (n_s+1)+1) \cdot (2 \cdot N_{ID}^{cell}+1)+2 \cdot N_{ID}^{cell}+1$, or with $c_{init}=2^{10} \cdot (n_s+1) \cdot (2 \cdot N_{ID}^{cell}+1)+2 \cdot N_{ID}^{cell}+1$, where $N_{ID}^{cell}$ represents the cell ID of the base station and $n_s$ may be a 0 or 1. In one example, $n_s$ is 0. In another example, $n_s$ is 0 in the first synchronization subframe and $n_s$ is 25 in the second synchronization subframe.

In a fourth example of synchronization signal optimizations for symbol index detection, a base station 105 may transmit synchronization signals, including an ESS sequence, differently in different synchronization subframes 210 of a frame. The frame may include two or more synchronization subframes, such as synchronization subframe 210-a and synchronization subframe 210-b. Between the synchronization subframes 210 may be one or more other subframes (e.g., subframe 220-a). The ESS associated with a symbol index of the first synchronization subframe 210-a may be different than the ESS associated with the same symbol index, but of the second synchronization subframe 210-b. For example, the ESS in synchronization subframe 210-a may be determined by application of a particular cyclic shift to a Zadoff-Chu sequence (or another sequence having zero cyclic autocorrelation at all substantially nonzero lags). The ESS in synchronization subframe 210-b may be determined by application of a different cyclic shift to the same Zadoff-Chu sequence (or another zero correlation, such that the ESS are different even though the symbol index may be the same between the two synchronization subframes.

In some examples, the Zadoff-Chu sequence may be the sequence associated with the PSS sequence for the two synchronization subframes, such that each ESS sequence may be determined by applying a first set of cyclic shifts to the PSS sequence for the first synchronization subframe 210-a and applying a second set of cyclic shifts to the PSS sequence for the second synchronization subframe 210-b.

In some examples, base station 105 may determine a first ESS sequence for a first synchronization subframe of a frame to be communicated to a UE 115, the first ESS sequence including a first ESS associated with a symbol index in the first synchronization subframe and generating a second ESS sequence for a second synchronization subframe of the frame, the second ESS sequence including, in the second synchronization subframe, a second ESS associated with the symbol index, where the first ESS is different from the second ESS. For example, let $N_{symb}$ denote a number of symbols (such as OFDM symbols) in time in a synchronization subframe. Then the ESS used in a symbol index $l \in \{0,1, \ldots, N_{symb}-1\}$ of the first synchronization subframe may be different from the ESS used in the same symbol index l of the second synchronization subframe. This may be used in conjunction with symbol index specific scrambling of reference signals used for demodulation of a physical broadcast channel (PBCH), which may convey not only the symbol index l, but also an indication of whether the current subframe is a first synchronization subframe or a second synchronization subframe. If UE 115 assumes a wrong synchronization subframe number, then UE 115 may be more likely to infer a wrong symbol index l from the ESS, and may be less likely to decode a PBCH message. Conversely, if UE 115 assumes a correct synchronization subframe number, then UE 115 may be more likely to infer the correct symbol index number l from ESS, and thus may be more likely to decode the PBCH message. In some examples, base station 105 may convey the symbol index l in PBCH message. In other examples, the reference signals transmitted for PBCH demodulation in a symbol index $l \in \{0,1, \ldots, N_{symb}-1\}$ of the first synchronization subframe may be different from the reference signals transmitted in the same symbol index l of the second synchronization subframe.

In other examples, a first ESS sequence in a first synchronization subframe and a second ESS in a second synchronization subframe may be different, and a first ESS associated with a particular symbol index l of the first synchronization subframe may be different than a second ESS associated with the symbol index l of the second synchronization subframe. Different techniques may be used to generate the second ESS according to various aspects of the present disclosure, as further described below.

In some examples, a first ESS associated with the symbol index l of the first synchronization subframe is a sequence that may be determined according to Eq. 2:

$$(d((n+\Delta_{shift}l) \bmod N), n=0,1, \ldots N-1) \quad (2)$$

where $\Delta_{shift}$ represents the step-size of cyclic shift, N represents the ESS sequence length, $(d(n), n=0,1, \ldots, N)$ represents the sequence that is cyclically shifted to obtain ESS, and l represents the symbol index. The second ESS associated with the symbol index l of the second synchronization subframe includes a second sequence that may be determined according a number of different techniques, as further described below.

In one example, the first ESS is determined according to Eq. 2, and a second ESS associated with the symbol index of the second synchronization subframe is a sequence that may be determined according to Eq. 3:

$$(d((n+\Delta_{shift}(l+\theta) \bmod N_{symb})) \bmod N), n=0,1, \ldots N-1) \quad (3)$$

where θ represents a fixed offset, $\Delta_{shift}$ represents the step-size of cyclic shift, N represents the ESS sequence length, $(d(n), n=0,1, \ldots, N)$ represents the sequence that is cyclically shifted to obtain ESS, l represents the symbol index, and $N_{symb}$ represents the number of symbols (such as OFDM symbols) in time in the first synchronization subframe. In some examples of the method, apparatus, or non-transitory computer-readable medium described above, θ is seven (7). In some examples, $$\theta \text{ is } \left\lfloor \frac{N_{symb}}{2} \right\rfloor.$$

In other examples, $$N_{symb} = 14,$$
$$N = 63,$$
$$d(n) = e^{-j\frac{\pi rn(n+1)}{N}} \text{ for fixed } r \in \{25, 29, 34\},$$
$$\text{and } \Delta_{shift} = 4.$$

In a second example, the first ESS is determined according to Eq. 2, and a second ESS associated with the symbol index of the second synchronization subframe is a sequence that may be determined according to Eq. 4:

$$(d((n+\Delta_{shift}(l+\theta) \bmod N), n=0,1, \ldots N-1) \quad (4)$$

where θ represents a fixed offset, $\Delta_{shift}$ represents the step-size of cyclic shift, N represents the ESS sequence length, $(d(n), n=0,1, \ldots, N)$ represents the sequence that is cyclically shifted to obtain ESS, and l represents the symbol index. In some examples, θ is seven (7). In other examples, θ is $$\left\lfloor \frac{N_{symb}}{2} \right\rfloor,$$

where $N_{symb}$ represents the number of symbols (such as OFDM symbols) in time in the first synchronization subframe. In some examples, $$N_{symb} = 14, N = 63, d(n) = e^{-j\frac{\pi rn(n+1)}{N}} \text{ for fixed } r \in \{25, 29, 34\},$$
$$\text{and } \Delta_{shift} = 4.$$

In a third example, the first ESS is determined according to Eq. 2, and a second ESS associated with the symbol index of the second synchronization subframe is a sequence that may be determined according to Eq. 5:

$$(d((n+\Delta_{shift}l+\phi) \bmod N), n=0,1, \ldots N-1) \quad (5)$$

where $\phi$ represents a fixed offset, $\Delta_{shift}$ represents the step-size of cyclic shift, N represents the ESS sequence length, (d(n),n=0,1, . . . , N) represents the sequence that is cyclically shifted to obtain ESS, and l represents the symbol index. In some examples, $\phi$ is thirty-two (32). In other examples, $\phi$ is twenty-eight (28). In still other examples, $$\phi = \left\lfloor \frac{N_{symb}}{2} \right\rfloor \Delta_{shift},$$

where $N_{symb}$ represents the number of symbols (such as OFDM symbols) in time in the first synchronization subframe.

In some examples, an ESS may include a cyclically shifted version of a sequence, where the cyclic shift used in symbol index l of the first synchronization subframe is different from the cyclic shift used in the same symbol index l of the second synchronization subframe. The ESS in symbol index l of the first synchronization subframe and the ESS in the symbol index l of the second synchronization subframe may be obtained by different cyclic shifts of a sequence of length N as according to Eq. 6 as follows:

$$d^l(n) = \begin{cases} d((n + \Delta_{shift} \cdot l) \bmod N) & \text{in first sync subframe} \\ d((n + \Delta_{shift} \cdot ((l + \theta) \bmod (N_{symb}))) \bmod N) & \text{in second sync subframe} \end{cases} \quad (6)$$

where $\theta$ represents a fixed number, and $\Delta_{shift}$ represents a step size of a cyclic shift, l represents the symbol index, and N represents a constant, as above for Eq. 2. In some examples, $$\theta = \left\lfloor \frac{N_{symb}}{2} \right\rfloor.$$

In other examples, the ESS in symbol index l of the first synchronization subframe may be the same sequence used for ESS in symbol index (l+$\theta$)mod $N_{symb}$ of the second synchronization subframe, for a fixed integer number $\theta$. In some examples, $$\theta = \left\lfloor \frac{N_{symb}}{2} \right\rfloor.$$

In yet other examples, the ESS in symbol index l of the first synchronization subframe and the ESS in symbol index l of the second synchronization subframe may be obtained by different cyclic shifts of a sequence of length N according to Eq. 7 as follows:

$$d^l(n) = \begin{cases} d((n + \Delta_{shift} \cdot l) \bmod N) & \text{in first sync subframe} \\ d((n + \Delta_{shift} \cdot l + \phi) \bmod N) & \text{in second sync subframe} \end{cases} \quad (7)$$

for a fixed integer $\phi$. In some examples, $$\phi = \left\lfloor \frac{N_{symb}}{2} \right\rfloor \Delta_{shift}.$$

As shown in the above Eqs. 2-6, $\Delta_{shift}$ may be a fixed parameter denoting the step-size of a cyclic shift, and N may be a fixed parameter denoting the length of the ESS sequence. In some examples, for example, for a system with $N_{symb}$=14, the parameter N may have a value of 63 and the parameter $\Delta_{shift}$ may have a value of 4.

In some examples, the first ESS associated with the symbol index of the first synchronization subframe includes a first sequence according to Eq. 8 as follows:

$$\left( d\left( \left( n + \left\lfloor \frac{Nl}{N_{symb}} \right\rfloor \right) \bmod N \right), n = 0, 1, \ldots N - 1 \right) \quad (8)$$

and the second ESS associated with the symbol index of the second synchronization subframe includes a second sequence according to Eq. 9 as follows:

$$\left( d\left( \left( n + \left\lfloor \frac{N((l + \theta) \bmod N_{symb})}{N_{symb}} \right\rfloor \right) \bmod N \right), n = 0, 1, \ldots N - 1 \right) \quad (9)$$

where $\theta$ represents a fixed offset, N represents the ESS sequence length, (d (n), n=0,1, . . . , N) represents the sequence that is cyclically shifted to obtain ESS, l represents the symbol index, and $N_{symb}$ represents the number of symbols (such as OFDM symbols) in time in the first synchronization subframe. In some examples, $\theta$ is seven (7). In some examples, $\theta$ is $$\left\lfloor \frac{N_{symb}}{2} \right\rfloor.$$

In some examples, $$N_{symb} = 14,$$
$$N = 63,$$
$$d(n) = e^{-j\frac{\pi r n(n+1)}{N}} \text{ for fixed } r \in \{25, 29, 34\}.$$

In some examples, the first ESS associated with the symbol index of the first synchronization subframe includes a first sequence according to Eq. 10 as follows:

$$\left( d\left( \left( n + \left\lfloor \frac{Nl}{N_{symb}} \right\rfloor \right) \bmod N \right), n = 0, 1, \ldots N - 1 \right) \quad (10)$$

and the second ESS associated with the symbol index of the second synchronization subframe includes a second sequence according to Ea. 11 as follows:

$$\left( d\left( \left( n + \left\lfloor \frac{N(l + \theta)}{N_{symb}} \right\rfloor \right) \bmod N \right), n = 0, 1, \ldots N - 1 \right) \quad (11)$$

where $\theta$ represents a fixed offset, N represents the ESS sequence length, (d (n), n=0,1, . . . , N) represents the sequence that is cyclically shifted to obtain ESS, l represents the symbol index, and $N_{symb}$ represents the number of symbols (such as OFDM symbols) in time in the first synchronization subframe. In some examples, θ is seven (7). In some examples, θ is $$\left\lfloor \frac{N_{symb}}{2} \right\rfloor.$$

In some examples, $N_{symb} = 14,$ $N = 63,$ $d(n) = e^{-j\frac{\pi rn(n+1)}{N}}$ for fixed $r \in \{25, 29, 34\}$.

In some examples, the first synchronization subframe 210-a and the second synchronization subframe 210-b may be alternated in a frame, such that the first and second synchronization subframes are periodically repeated (along with their associated ESS sequences).

In certain examples, the first synchronization subframe 210-a may be associated with a certain subframe index (e.g., subframe index 0) and the second synchronization subframe 210-b may be associated with a different subframe index (e.g., subframe index 25).

In other examples, other types of ESS sequences may be used, where the ESS sequence associated with the first synchronization subframe 210-a is different than the ESS sequence associated with the second synchronization subframe 210-b. The subframe index of first synchronization subframe 210-a and second synchronization subframe 210-b may be identified based on the different ESS sequences. Further, a UE 115 may identify a radio frame boundary based on the difference between the first synchronization subframe and the second synchronization subframe.

In various examples, a PSS may be punctured (e.g., at indices corresponding to a direct current (DC) subcarrier) before transmission, but an ESS sequence may be based on the un-punctured version of the PSS.

In a fifth example of synchronization signal optimizations for symbol index detection, base station 105-a may transmit the same ESS sequence as a base station 105-b, for example where base station 105-a and base station 105-b are synchronized. In other examples, the whole wireless network may transmit the same ESS sequence in a synchronization subframe. For example, the transmission of synchronization subframe 210-a may be synchronized with the transmission of synchronization subframe 210-b, such that the same ESS sequence (e.g., ESS sequence may be transmitted using the same resource elements (REs)) in each of the synchronization subframes may constructively interfere. This constructive interference may, for example, enhance detection by UE 115-a by increasing the possibility that UE 115-a will successfully receive the constructively interfering signals.

Figure 3:
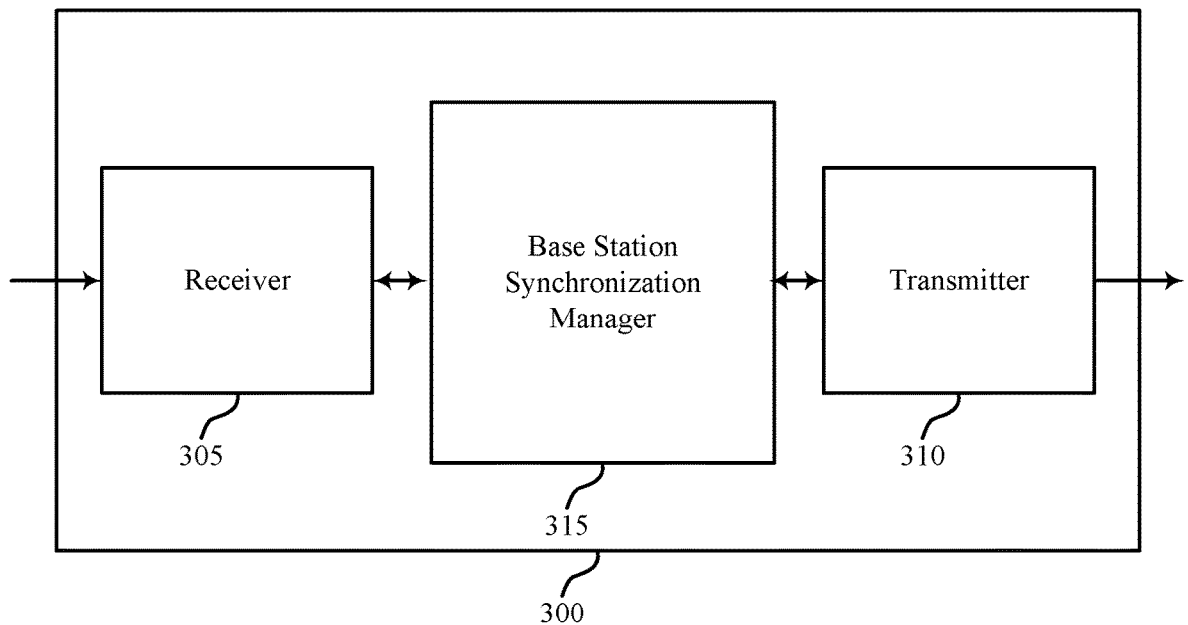
FIGS. 3 through 5 show block diagrams of a wireless device that supports synchronization signal optimizations for symbol index detection in accordance with aspects of the present disclosure.

FIG. 3 shows a block diagram of a wireless device 300 that supports synchronization signal optimizations for symbol index detection in accordance with various aspects of the present disclosure. Wireless device 300 may be an example of aspects of a base station 105 described with reference to FIGS. 1 and 2. Wireless device 300 may include receiver 305, transmitter 310 and base station synchronization manager 315. Wireless device 300 may also include a processor. Each of these components may be in communication with each other.

The receiver 305 may receive information such as packets, user data, or control information associated with various information channels (e.g., control channels, data channels, and information related to synchronization signal optimizations for symbol index detection, etc.). Information may be passed on to other components of the device. The receiver 305 may be an example of aspects of the transceiver 625 described with reference to FIG. 6.

The transmitter 310 may transmit signals received from other components of wireless device 300. In some examples, the transmitter 310 may be collocated with a receiver in a transceiver module. For example, the transmitter 310 may be an example of aspects of the transceiver 625 described with reference to FIG. 6. The transmitter 310 may include a single antenna, or it may include a plurality of antennas.

The base station synchronization manager 315 may generate an ESS sequence for a synchronization subframe to be communicated to a UE, scramble the ESS sequence based on cell-specific information associated with the base station, and transmit, to the UE, the scrambled ESS sequence in the synchronization subframe.

The base station synchronization manager 315 may also determine a first ESS sequence for a first synchronization subframe of a frame to be communicated to a UE, the first ESS sequence including a first ESS associated with a symbol index in the first synchronization subframe, and generate a second ESS sequence for a second synchronization subframe of the frame, the second ESS sequence including, in the second synchronization subframe, a second ESS associated with the symbol index, wherein the first ESS is different from the second ESS.

The base station synchronization manager 315 may also identify an ESS root index used by the set of base stations to generate an ESS sequence at each of the set of base stations, generate the ESS sequence at the base station using the ESS root index, and transmit, to a UE, the ESS sequence in a synchronization subframe.

The base station synchronization manager 315 may also identify a PSS sequence of a synchronization subframe, determine, for the synchronization subframe, an ESS sequence based on the PSS sequence, and transmit the synchronization subframe. The base station synchronization manager 315 may also be an example of aspects of the base station synchronization manager 605 described with reference to FIG. 6.

Figure 4:
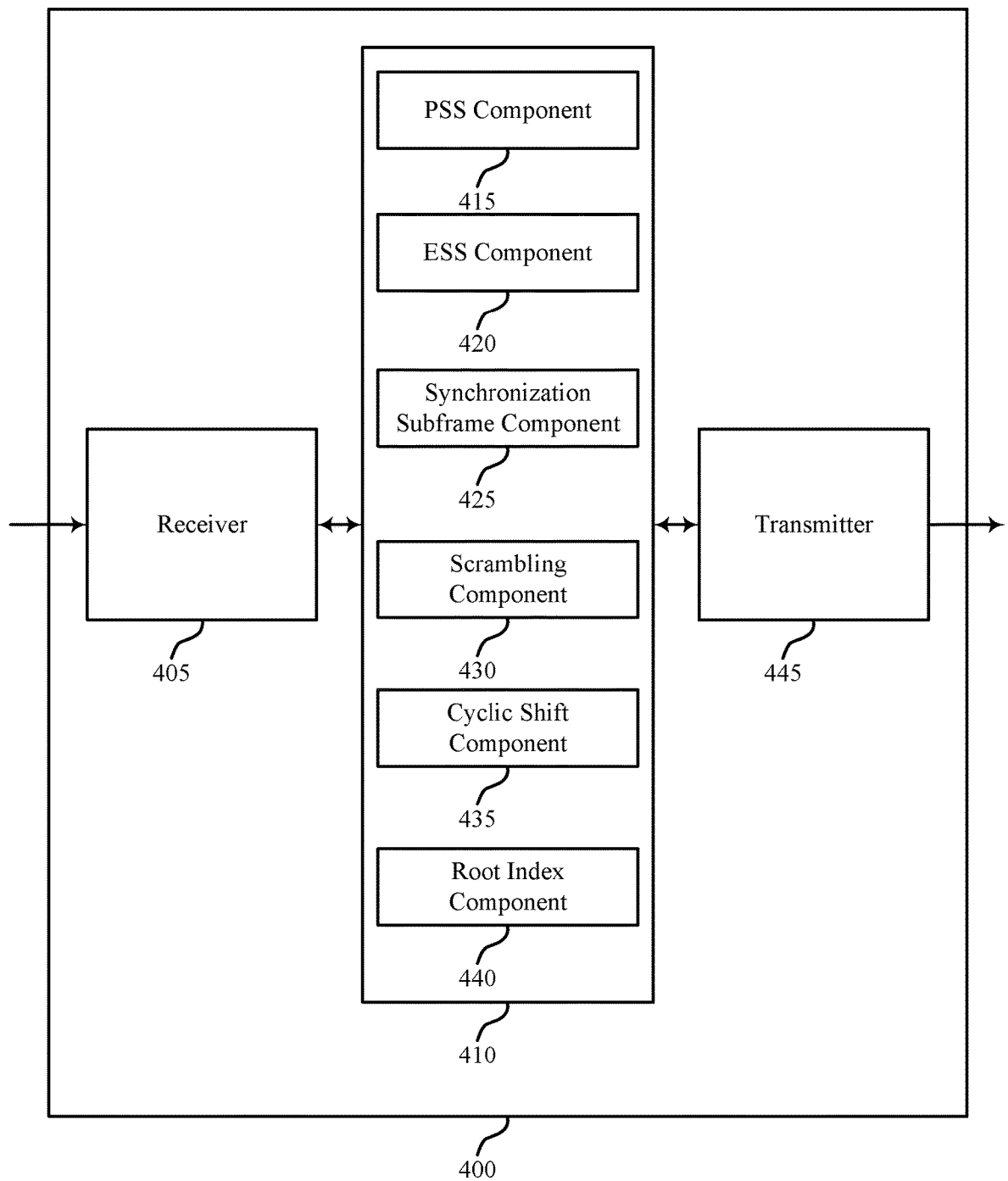

FIG. 4 shows a block diagram of a wireless device 400 that supports synchronization signal optimizations for symbol index detection in accordance with various aspects of the present disclosure. Wireless device 400 may be an example of aspects of a wireless device 300 or a base station 105 described with reference to FIGS. 1, 2 and 3. Wireless device 400 may include receiver 405, base station synchronization manager 410 and transmitter 445. Wireless device 400 may also include a processor. Each of these components may be in communication with each other.

The receiver 405 may receive information which may be passed on to other components of the device. The receiver 405 may also perform the functions described with reference to the receiver 305 of FIG. 3. The receiver 405 may be an example of aspects of the transceiver 625 described with reference to FIG. 6.

The base station synchronization manager 410 may be an example of aspects of base station synchronization manager 315 described with reference to FIG. 3. The base station synchronization manager 410 may include PSS component 415, ESS component 420, synchronization subframe component 425, scrambling component 430, cyclic shift component 435 and root index component 440. The base station synchronization manager 410 may be an example of aspects of the base station synchronization manager 605 described with reference to FIG. 6.

The PSS component 415 may identify a PSS sequence of a synchronization subframe. In some cases, the PSS sequence includes a Zadoff-Chu sequence.

The ESS component 420 may identify an ESS. For example, ESS component 420 may determine the ESS sequence to be the conjugate of the PSS sequence, generate an ESS sequence for a synchronization subframe to be communicated to a UE, and determine a first ESS sequence for a first synchronization subframe of a frame to be communicated to a UE, the first ESS sequence including a first ESS associated with a symbol index in the first synchronization subframe.

The ESS component 420 may also generate a second ESS sequence for a second synchronization subframe of the frame, the second ESS sequence including, in the second synchronization subframe, a second ESS associated with the symbol index, wherein the first ESS is different from the second ESS. The ESS component 420 may also generate the ESS sequence at the base station using the ESS root index. For example, the ESS component 420 may determine, for the synchronization subframe, an ESS sequence based on the PSS sequence, and generate the ESS sequence using the determined ESS root index.

In some cases, determining the ESS sequence includes determining the ESS sequence such that a shift in a correlation peak of the ESS sequence due to CFO corresponds with a shift in a correlation peak of the PSS sequence. In some cases, determining the ESS sequence includes determining the ESS sequence such that a shift in a correlation peak of the ESS sequence due to CFO corresponds with but is in an opposite direction as a shift in a correlation peak of the PSS sequence. In some cases, the ESS sequence includes a Zadoff-Chu sequence.

The synchronization subframe component 425 may transmit, to the UE, the scrambled ESS sequence in the synchronization subframe, or alternately transmit a first ESS sequence for a first synchronization subframe of the frame and a second ESS sequence for a second synchronization subframe of the frame. In some cases, the synchronization subframe component 425 may transmit one or more subframes between the first synchronization subframe and the second synchronization subframe. In some cases, the first synchronization subframe has a subframe index of value zero, and the second synchronization subframe has a subframe index of value twenty-five.

The scrambling component 430 may scramble the ESS sequence based on cell-specific information associated with the base station. In some cases, the cell-specific information includes a cell ID or virtual cell ID of the base station.

The cyclic shift component 435 may determine that generating the first ESS sequence includes applying a first cyclic shift to a PSS sequence. In some cases, generating the second ESS sequence includes applying a second cyclic shift to the PSS sequence. In some cases, generating the second ESS sequence includes applying a cyclic shift to the first ESS sequence.

The root index component 440 may identify an ESS root index used by the set of base stations to generate an ESS sequence at each of the set of base stations. In some cases, determining the ESS root index includes selecting the ESS root index to have a same value as the PSS root index. In some cases, the set of base stations are synchronized. In some cases, determining the ESS sequence includes determining the ESS root index based on a PSS root index associated with the PSS sequence.

The transmitter 445 may transmit signals received from other components of wireless device 400. In some examples, the transmitter 445 may be collocated with a receiver in a transceiver module. For example, the transmitter 445 may be an example of aspects of the transceiver 625 described with reference to FIG. 6. The transmitter 445 may utilize a single antenna, or it may utilize a plurality of antennas.

Figure 5:
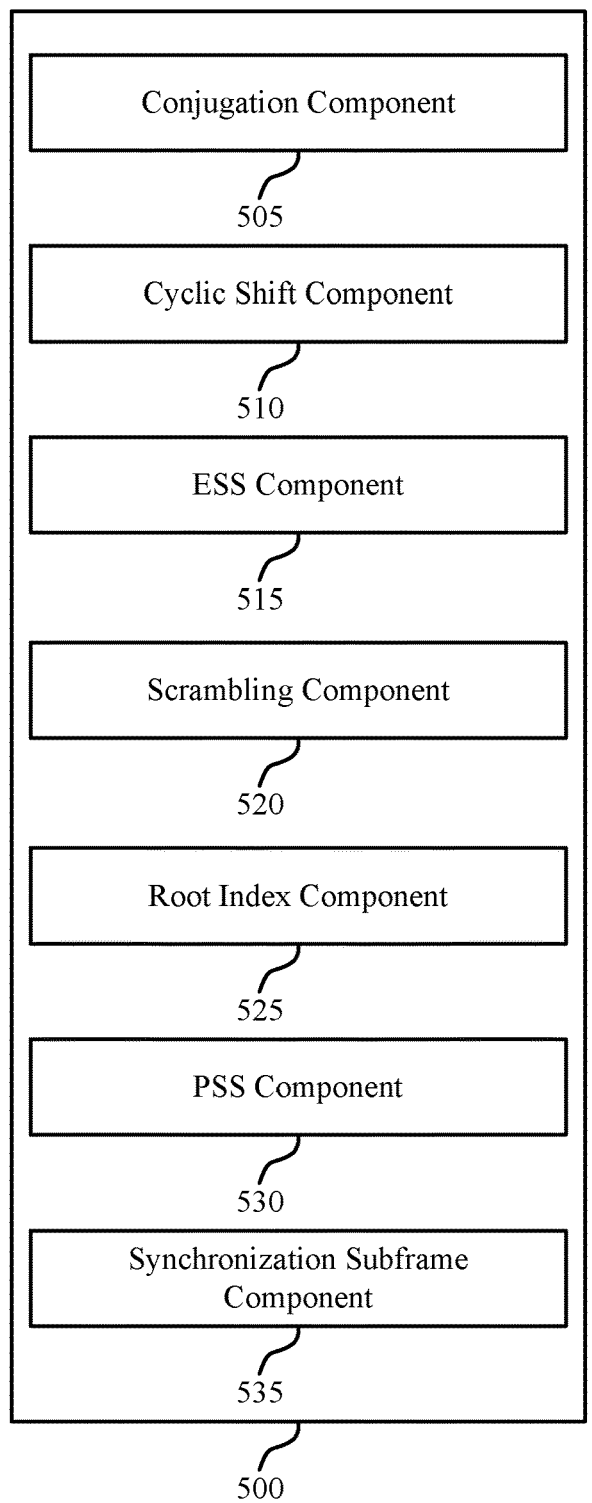

FIG. 5 shows a block diagram of a base station synchronization manager 500 which may be an example of the corresponding component of wireless device 300 or wireless device 400. That is, base station synchronization manager 500 may be an example of aspects of base station synchronization manager 315 or base station synchronization manager 410 described with reference to FIGS. 3 and 4. The base station synchronization manager 500 may also be an example of aspects of the base station synchronization manager 605 described with reference to FIG. 6.

The base station synchronization manager 500 may include conjugation component 505, cyclic shift component 510, ESS component 515, scrambling component 520, root index component 525, PSS component 530 and synchronization subframe component 535. Each of these modules may communicate, directly or indirectly, with one another (e.g., via one or more buses).

The conjugation component 505 may determine that generating the ESS sequence includes generating a conjugate of the PSS sequence.

The cyclic shift component 510 may determine that generating the first ESS sequence includes applying a first cyclic shift to a PSS sequence. In some cases, generating the second ESS sequence includes applying a second cyclic shift to the PSS sequence. In some cases, generating the second ESS sequence includes applying a cyclic shift to the first ESS sequence.

The ESS component 515 may determine an ESS sequence. For example, it may determine the ESS sequence to be the conjugate of the PSS sequence, and generate an ESS sequence for a synchronization subframe to be communicated to a UE. The ESS component 515 may also determine a first ESS sequence for a first synchronization subframe of a frame to be communicated to a UE, the first ESS sequence including a first ESS associated with a symbol index in the first synchronization subframe, and generate a second ESS sequence for a second synchronization subframe of the frame, the second ESS sequence including, in the second synchronization subframe, a second ESS associated with the symbol index, wherein the first ESS is different from the second ESS. The ESS component may also generate the ESS sequence at the base station using the ESS root index. For example, the ESS component may determine, for the synchronization subframe, an ESS sequence based on the PSS sequence, and generate the ESS sequence using the determined ESS root index.

The scrambling component 520 may scramble the ESS sequence based on cell-specific information associated with the base station. In some cases, the cell-specific information includes a cell ID or virtual cell ID of the base station.

The root index component 525 may identify an ESS root index used by the set of base stations to generate an ESS sequence at each of the set of base stations. In some cases, determining the ESS root index includes selecting the ESS root index to have a same value as the PSS root index. In some cases, the set of base stations are synchronized. In some cases, determining the ESS sequence includes determining the ESS root index based on a PSS root index associated with the PSS sequence.

The PSS component 530 may identify a PSS sequence of a synchronization subframe. In some cases, the PSS sequence includes a Zadoff-Chu sequence.

The synchronization subframe component 535 may transmit, to the UE, the scrambled ESS sequence in the synchronization subframe, or alternately transmit, to the UE, a first synchronization subframe of the frame and a second synchronization subframe of the frame. In some cases, the synchronization subframe component 535 may transmit one or more subframes between the first synchronization subframe and the second synchronization subframe, or alternately transmit, to a UE, the ESS sequence in a synchronization subframe and the synchronization subframe. In some cases, the first synchronization subframe has a subframe index of value zero, and the second synchronization subframe has a subframe index of value twenty-five.

Figure 6:
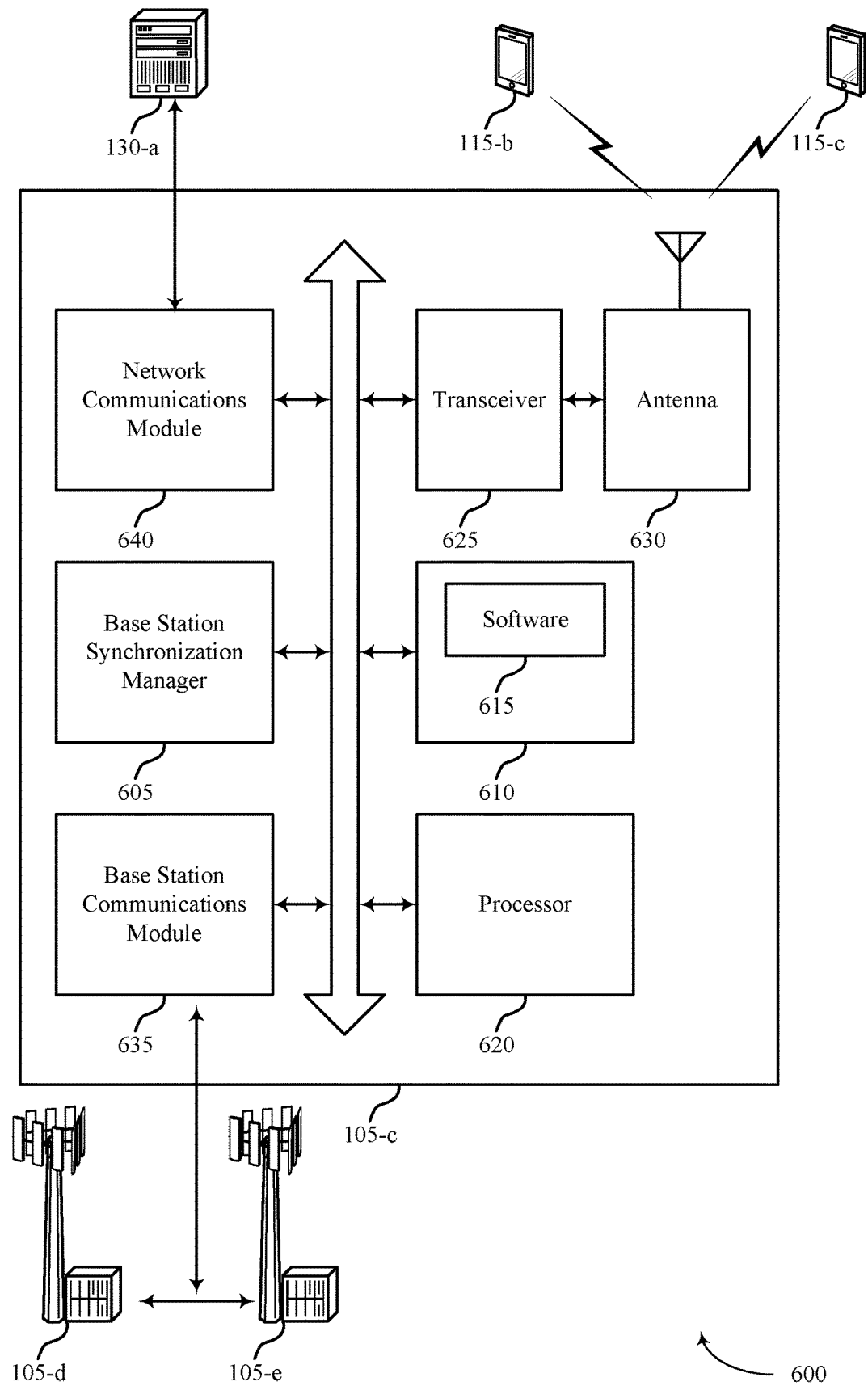
FIG. 6 illustrates a block diagram of a system including a base station that supports synchronization signal optimizations for symbol index detection in accordance with aspects of the present disclosure.

FIG. 6 shows a diagram of a wireless system 600 including a configured device that supports synchronization signal optimizations for symbol index detection in accordance with various aspects of the present disclosure. For example, system 600 may include base station 105-c, which may be an example of a wireless device 300, a wireless device 400, or a base station 105 as described with reference to FIGS. 1, 2 and 3 through 5. Base station 105-c may also include components for bi-directional voice and data communications including components for transmitting communications and components for receiving communications. For example, base station 105-c may communicate bi-directionally with one or more UEs 115.

Base station 105-c may also include base station synchronization manager 605, memory 610, processor 620, transceiver 625, antenna 630, base station communications module 635 and network communications module 640. Each of these modules may communicate, directly or indirectly, with one another (e.g., via one or more buses). The base station synchronization manager 605 may be an example of a base station synchronization manager as described with reference to FIGS. 3 through 5.

The memory 610 may include random access memory (RAM) and read only memory (ROM). The memory 610 may store computer-readable, computer-executable software including instructions that, when executed, cause the processor to perform various functions described herein (e.g., synchronization signal optimizations for symbol index detection, etc.). In some cases, the software 615 may not be directly executable by the processor but may cause a computer (e.g., when compiled and executed) to perform functions described herein. The processor 620 may include an intelligent hardware device, (e.g., a central processing unit (CPU), a microcontroller, an application specific integrated circuit (ASIC), etc.)

The transceiver 625 may communicate bi-directionally, via one or more antennas, wired, or wireless links, with one or more networks, as described above. For example, the transceiver 625 may communicate bi-directionally with a base station 105 or a UE 115. The transceiver 625 may also include a modem to modulate the packets and provide the modulated packets to the antennas for transmission, and to demodulate packets received from the antennas. In some cases, the wireless device may include a single antenna 630. However, in some cases the device may have more than one antenna 630, which may be capable of concurrently transmitting or receiving multiple wireless transmissions.

The base station communications module 635 may manage communications with other base station 105, and may include a controller or scheduler for controlling communications with UEs 115 in cooperation with other base stations 105. For example, the base station communications module 635 may coordinate scheduling for transmissions to UEs 115 for various interference mitigation techniques such as beamforming or joint transmission. In some examples, base station communications module 635 may provide an X2 interface within an LTE/LTE-A wireless communication network technology to provide communication between base stations 105.

The network communications module 640 may manage communications with the core network (e.g., via one or more wired backhaul links). For example, the network communications module 640 may manage the transfer of data communications for client devices, such as one or more UEs 115.

Figure 7:
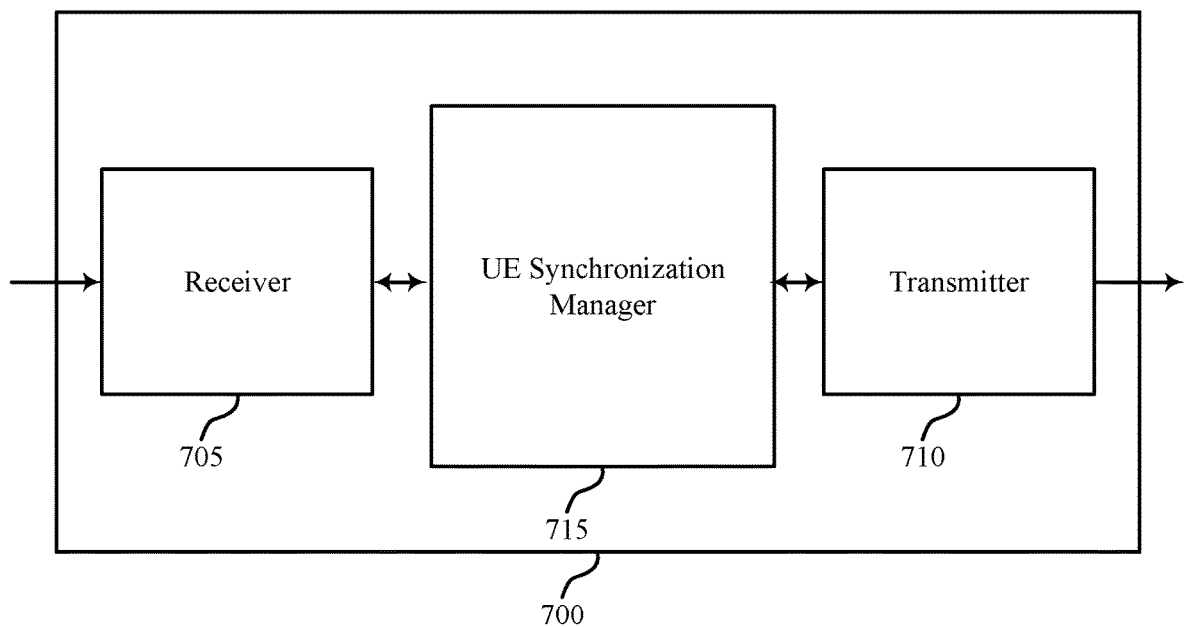
FIGS. 7 through 9 show block diagrams of a wireless device that supports synchronization signal optimizations for symbol index detection in accordance with aspects of the present disclosure.

FIG. 7 shows a block diagram of a wireless device 700 that supports synchronization signal optimizations for symbol index detection in accordance with various aspects of the present disclosure. Wireless device 700 may be an example of aspects of a UE 115 described with reference to FIGS. 1 and 2. Wireless device 700 may include receiver 705, transmitter 710 and UE synchronization manager 715. Wireless device 700 may also include a processor. Each of these components may be in communication with each other.

The receiver 705 may receive information such as packets, user data, or control information associated with various information channels (e.g., control channels, data channels, and information related to synchronization signal optimizations for symbol index detection, etc.). Information may be passed on to other components of the device. The receiver 705 may be an example of aspects of the transceiver 1025 described with reference to FIG. 10.

The transmitter 710 may transmit signals received from other components of wireless device 700. In some examples, the transmitter 710 may be collocated with a receiver in a transceiver module. For example, the transmitter 710 may be an example of aspects of the transceiver 1025 described with reference to FIG. 10. The transmitter 710 may include a single antenna, or it may include a plurality of antennas.

The UE synchronization manager 715 may receive, from a base station, a scrambled ESS sequence in a synchronization subframe, receive cell-specific information associated with the base station, and descramble the scrambled ESS sequence based on the cell-specific information. The UE synchronization manager 715 may also be an example of aspects of the UE synchronization manager 1005 described with reference to FIG. 10.

Figure 8:
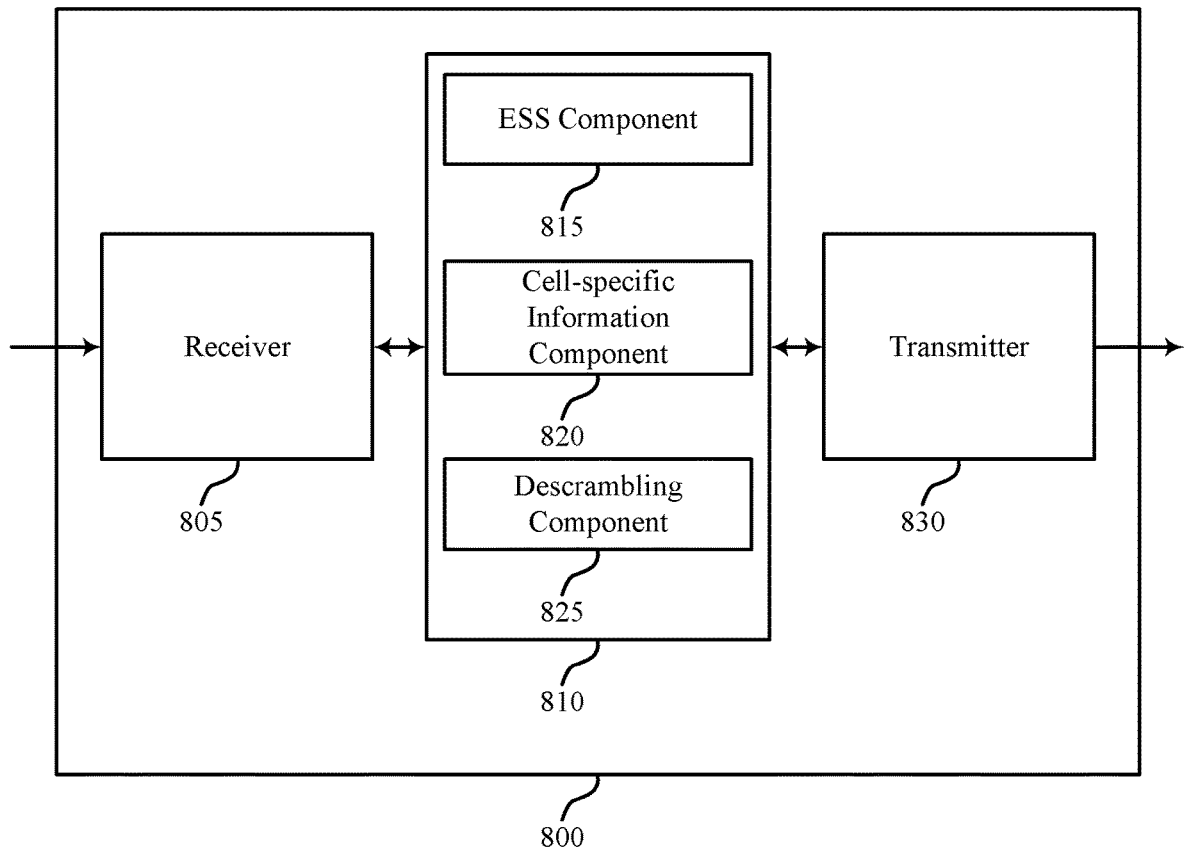

FIG. 8 shows a block diagram of a wireless device 800 that supports synchronization signal optimizations for symbol index detection in accordance with various aspects of the present disclosure. Wireless device 800 may be an example of aspects of a wireless device 700 or a UE 115 described with reference to FIGS. 1, 2 and 7. Wireless device 800 may include receiver 805, UE synchronization manager 810 and transmitter 830. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The UE synchronization manager 810 may be an example of aspects of UE synchronization manager 715 described with reference to FIG. 7. The UE synchronization manager

810 may include ESS component 815, cell information component 820 and descrambling component 825. The UE synchronization manager 810 may be an example of aspects of the UE synchronization manager 1005 described with reference to FIG. 10.

The ESS component 815 may receive, from a base station, a scrambled ESS sequence in a synchronization subframe, and receive, from a second base station, a second scrambled ESS sequence. The cell information component 820 may receive cell-specific information associated with the base station. The descrambling component 825 may descramble the scrambled ESS sequence based on the cell-specific information.

The transmitter 830 may transmit signals received from other components of wireless device 800. In some examples, the transmitter 830 may be collocated with a receiver in a transceiver module. For example, the transmitter 830 may be an example of aspects of the transceiver 1025 described with reference to FIG. 10. The transmitter 830 may utilize a single antenna, or it may utilize a plurality of antennas.

Figure 9:
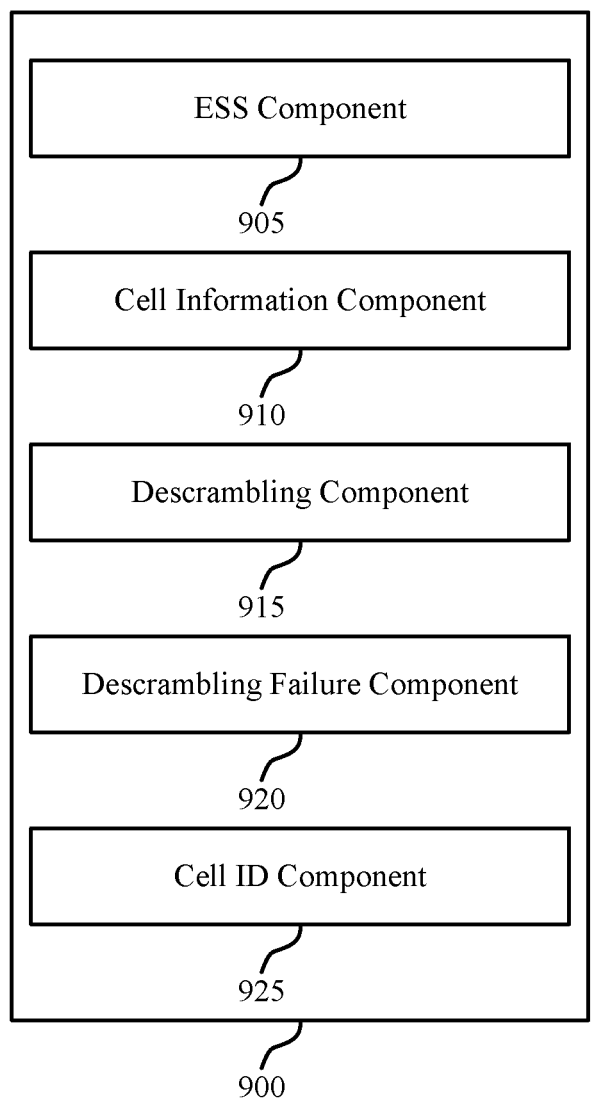

FIG. 9 shows a block diagram of a UE synchronization manager 900 which may be an example of the corresponding component of wireless device 700 or wireless device 800. That is, UE synchronization manager 900 may be an example of aspects of UE synchronization manager 715 or UE synchronization manager 810 described with reference to FIGS. 7 and 8. The UE synchronization manager 900 may also be an example of aspects of the UE synchronization manager 1005 described with reference to FIG. 10.

The UE synchronization manager 900 may include ESS component 905, cell information component 910, descrambling component 915, descrambling failure component 920 and cell ID component 925. Each of these modules may communicate, directly or indirectly, with one another (e.g., via one or more buses). The ESS component 905 may receive, from a base station, a scrambled ESS sequence in a synchronization subframe, and receive, from a second base station, a second scrambled ESS sequence.

The cell information component 910 may receive cell-specific information associated with the base station. The descrambling component 915 may descramble the scrambled ESS sequence based on the cell-specific information. The descrambling failure component 920 may determine that an attempt to descramble the second scrambled ESS sequence based on the cell-specific information has failed. The cell ID component 925 may determine a cell ID or virtual cell ID of the base station.

Figure 10:
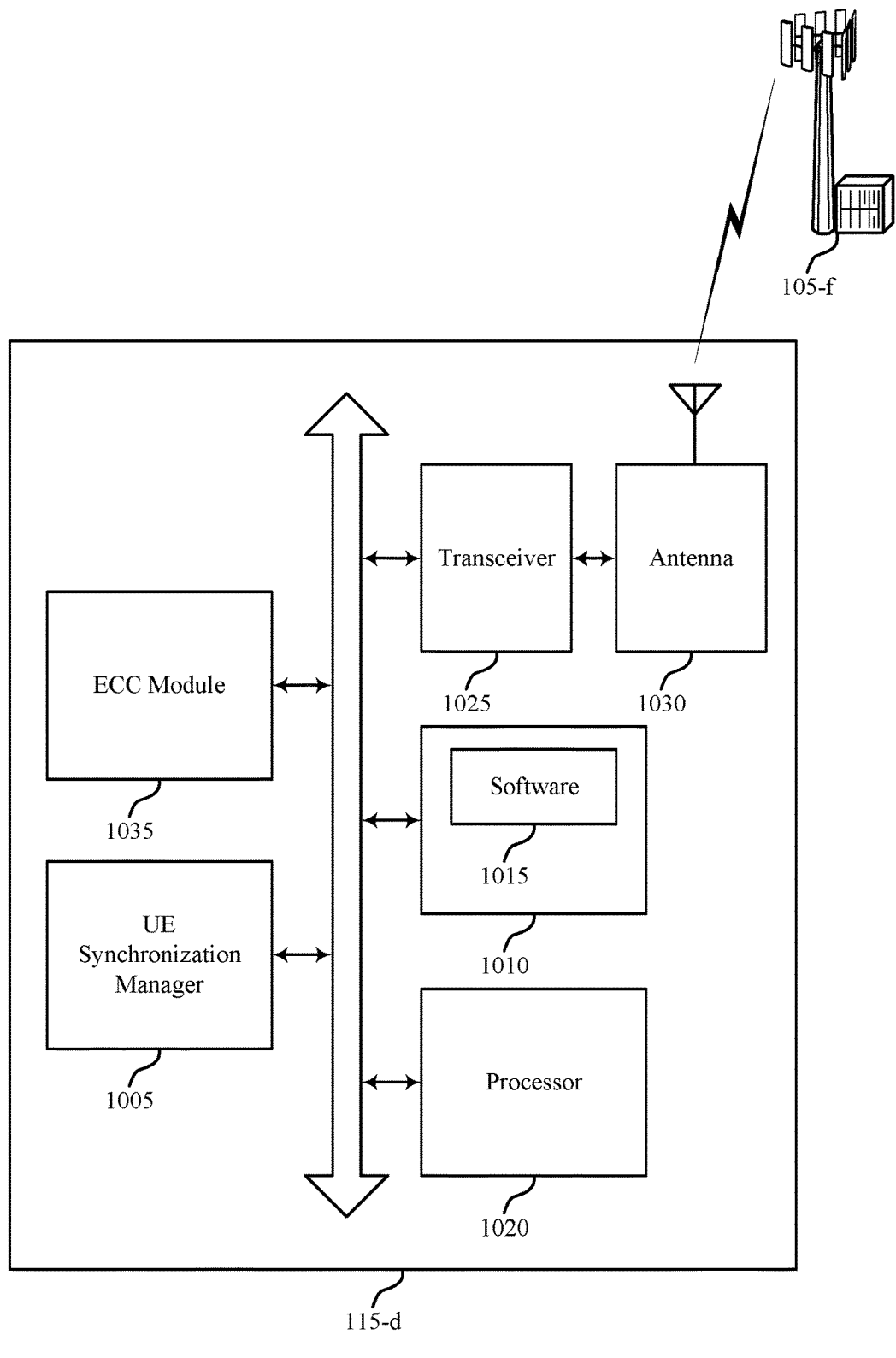
FIG. 10 illustrates a block diagram of a system including a UE that supports synchronization signal optimizations for symbol index detection in accordance with aspects of the present disclosure.

FIG. 10 shows a diagram of a system 1000 including a device that supports synchronization signal optimizations for symbol index detection in accordance with various aspects of the present disclosure. For example, system 1000 may include UE 115-*d*, which may be an example of a wireless device 700, a wireless device 800, or a UE 115 as described with reference to FIGS. 1, 2 and 7 through 9.

UE 115-d may also include UE synchronization manager 1005, memory 1010, processor 1020, transceiver 1025, antenna 1030 and ECC module 1035. Each of these modules may communicate, directly or indirectly, with one another (e.g., via one or more buses). The UE synchronization manager 1005 may be an example of a UE synchronization manager as described with reference to FIGS. 7 through 9.

The memory 1010 may include RAM and ROM. The memory 1010 may store computer-readable, computer-executable software including instructions that, when executed, cause the processor to perform various functions described herein (e.g., synchronization signal optimizations for symbol index detection, etc.). In some cases, the software 1015 may not be directly executable by the processor but may cause a computer (e.g., when compiled and executed) to perform functions described herein. The processor 1020 may include an intelligent hardware device, (e.g., a CPU, a microcontroller, an ASIC, etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 630, which may be capable of concurrently transmitting or receiving multiple wireless transmissions.

ECC module 1035 may enable operations using enhanced component carriers (ECCs) such as communication using shared or unlicensed spectrum, using reduced TTIs or subframe durations, or using a large number of component carriers.

Figure 11:
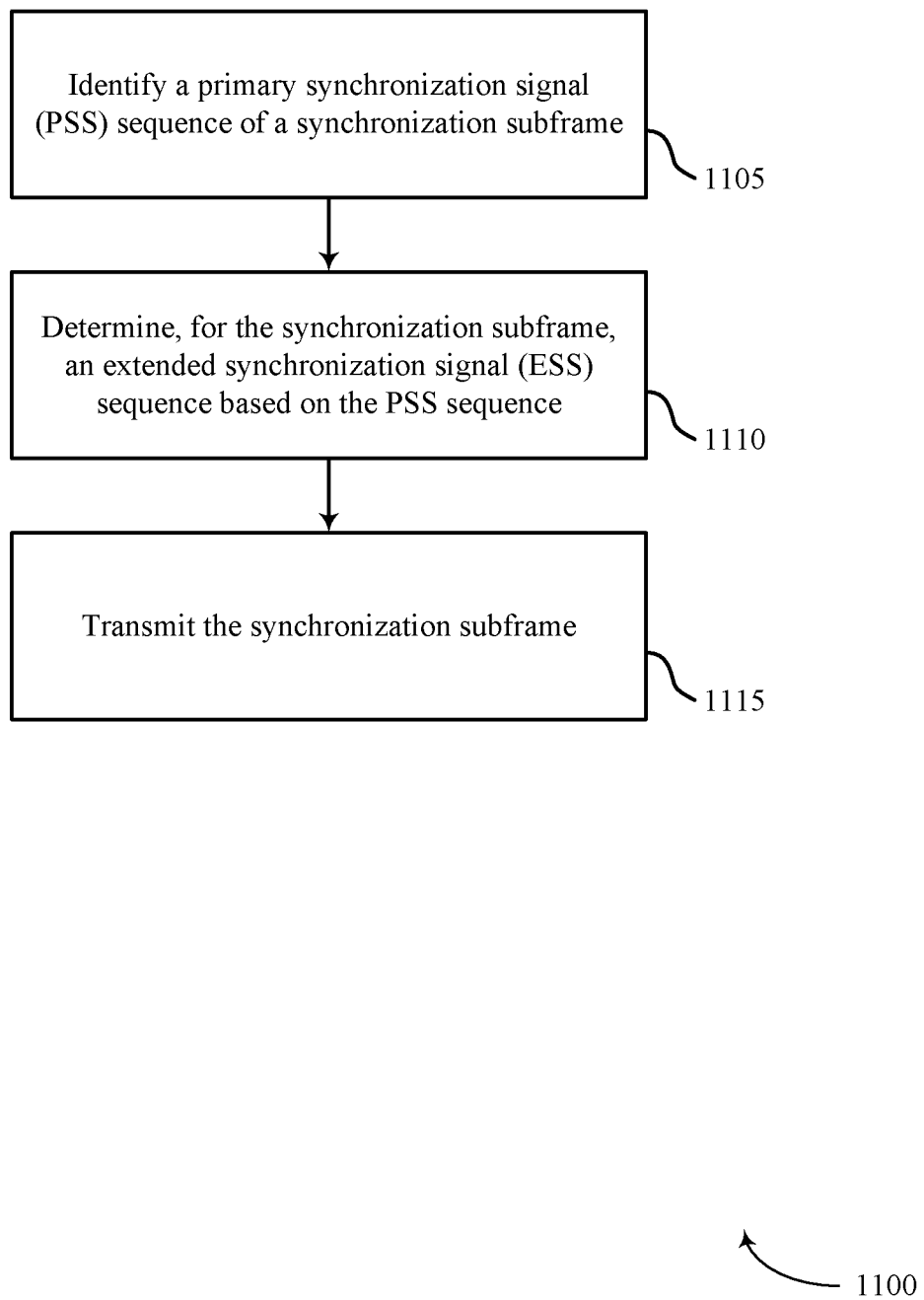
FIGS. 11 through 17 illustrate methods for synchronization signal optimizations for symbol index detection in accordance with aspects of the present disclosure.

FIG. 11 shows a flowchart illustrating a method 1100 for synchronization signal optimizations for symbol index detection in accordance with various aspects of the present disclosure. The operations of method 1100 may be implemented by a device such as a base station 105 or its components as described with reference to FIGS. 1 and 2. For example, the operations of method 1100 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1105, the base station 105 may identify a PSS sequence of a synchronization subframe as described above with reference to FIGS. 1 through 2. In certain examples, the operations of block 1105 may be performed by the PSS component as described with reference to FIGS. 4 and 5.

At block 1110, the base station 105 may determine, for the synchronization subframe, an ESS sequence based on the PSS sequence as described above with reference to FIGS. 1 through 2. In certain examples, the operations of block 1110 may be performed by the ESS component as described with reference to FIGS. 4 and 5.

At block 1115, the base station 105 may transmit the synchronization subframe as described above with reference to FIGS. 1 through 2. In certain examples, the operations of block 1115 may be performed by the synchronization subframe component as described with reference to FIGS. 4 and 5.

Figure 12:
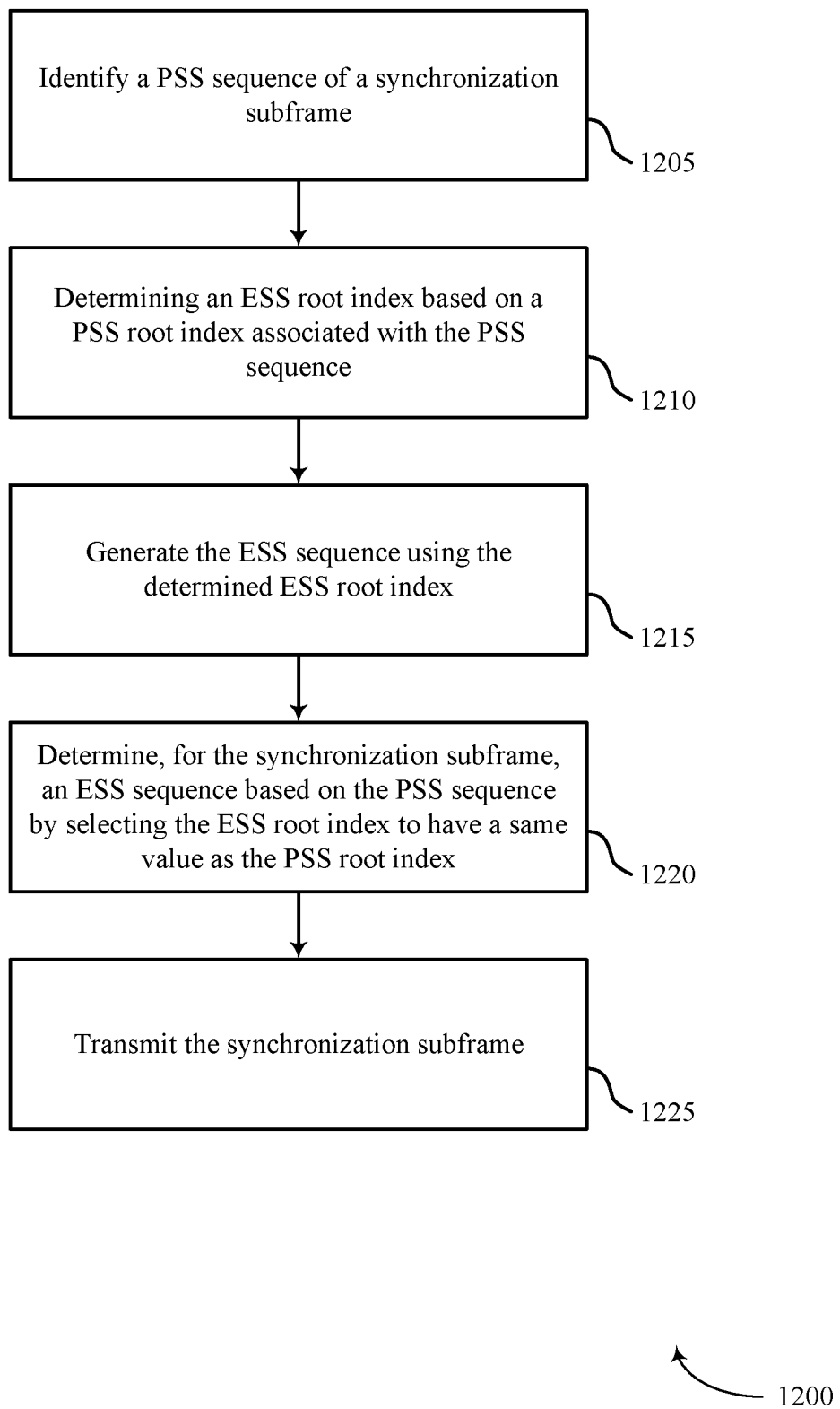

FIG. 12 shows a flowchart illustrating a method 1200 for synchronization signal optimizations for symbol index detection in accordance with various aspects of the present disclosure. The operations of method 1200 may be implemented by a device such as a base station 105 or its components as described with reference to FIGS. 1 and 2. For example, the operations of method 1200 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1205, the base station 105 may identify a PSS sequence of a synchronization subframe as described above with reference to FIGS. 1 through 2. In certain examples, the operations of block 1205 may be performed by the PSS component as described with reference to FIGS. 4 and 5.

At block 1210, the base station 105 may determine an ESS root index based on a PSS root index associated with the PSS sequence as described above with reference to FIGS. 1 through 2. In some cases, determining the ESS root index includes selecting the ESS root index to have a same value as the PSS root index. In certain examples, the operations of block 1210 may be performed by the root index component as described with reference to FIGS. 4 and 5.

At block 1215, the base station 105 may generate the ESS sequence using the determined ESS root index as described above with reference to FIGS. 1 through 2. In certain examples, the operations of block 1215 may be performed by the ESS component as described with reference to FIGS. 4 and 5.

At block 1220, the base station 105 may determine, for the synchronization subframe, an ESS sequence based on the PSS sequence as described above with reference to FIGS. 1 through 2. In certain examples, the operations of block 1220 may be performed by the ESS component as described with reference to FIGS. 4 and 5.

At block 1225, the base station 105 may transmit the synchronization subframe as described above with reference to FIGS. 1 through 2. In certain examples, the operations of block 1225 may be performed by the synchronization subframe component as described with reference to FIGS. 4 and 5.

Figure 13:
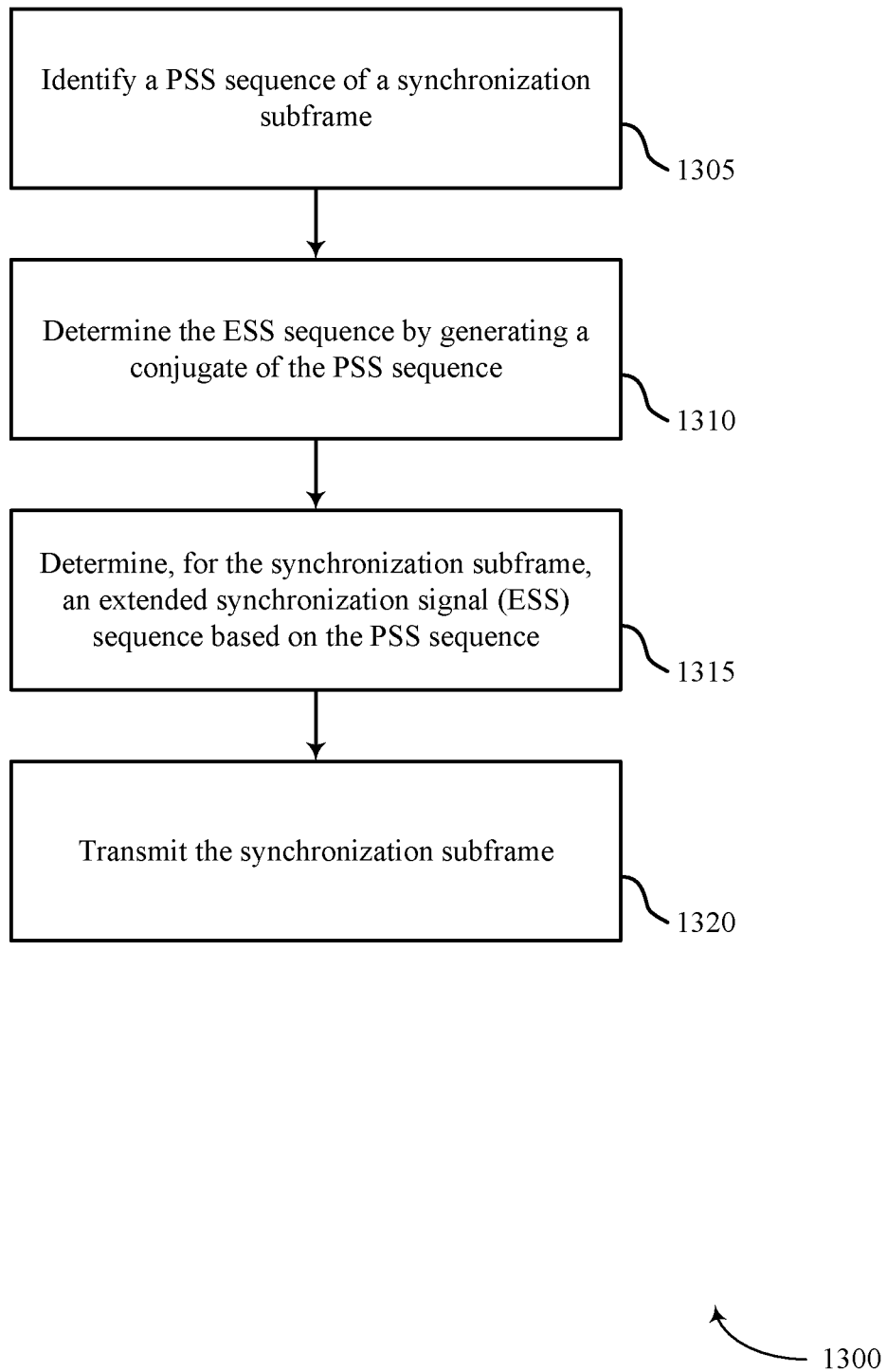

FIG. 13 shows a flowchart illustrating a method 1300 for synchronization signal optimizations for symbol index detection in accordance with various aspects of the present disclosure. The operations of method 1300 may be implemented by a device such as a base station 105 or its components as described with reference to FIGS. 1 and 2. For example, the operations of method 1300 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1305, the base station 105 may identify a PSS sequence of a synchronization subframe as described above with reference to FIGS. 1 through 2. In certain examples, the operations of block 1305 may be performed by the PSS component as described with reference to FIGS. 4 and 5.

At block 1310, the base station 105 may determine the ESS sequence by generating a conjugate of the PSS sequence as described above with reference to FIGS. 1 through 2. In certain examples, the operations of block 1310 may be performed by the conjugation component as described with reference to FIGS. 4 and 5.

At block 1315, the base station 105 may determine, for the synchronization subframe, an ESS sequence based on the PSS sequence as described above with reference to FIGS. 1 through 2. In some cases, the base station 105 may determine the ESS sequence to be the conjugate of the PSS sequence. In certain examples, the operations of block 1315 may be performed by the ESS component as described with reference to FIGS. 4 and 5.

At block 1320, the base station 105 may transmit the synchronization subframe as described above with reference to FIGS. 1 through 2. In certain examples, the operations of block 1320 may be performed by the synchronization subframe component as described with reference to FIGS. 4 and 5.

Figure 14:
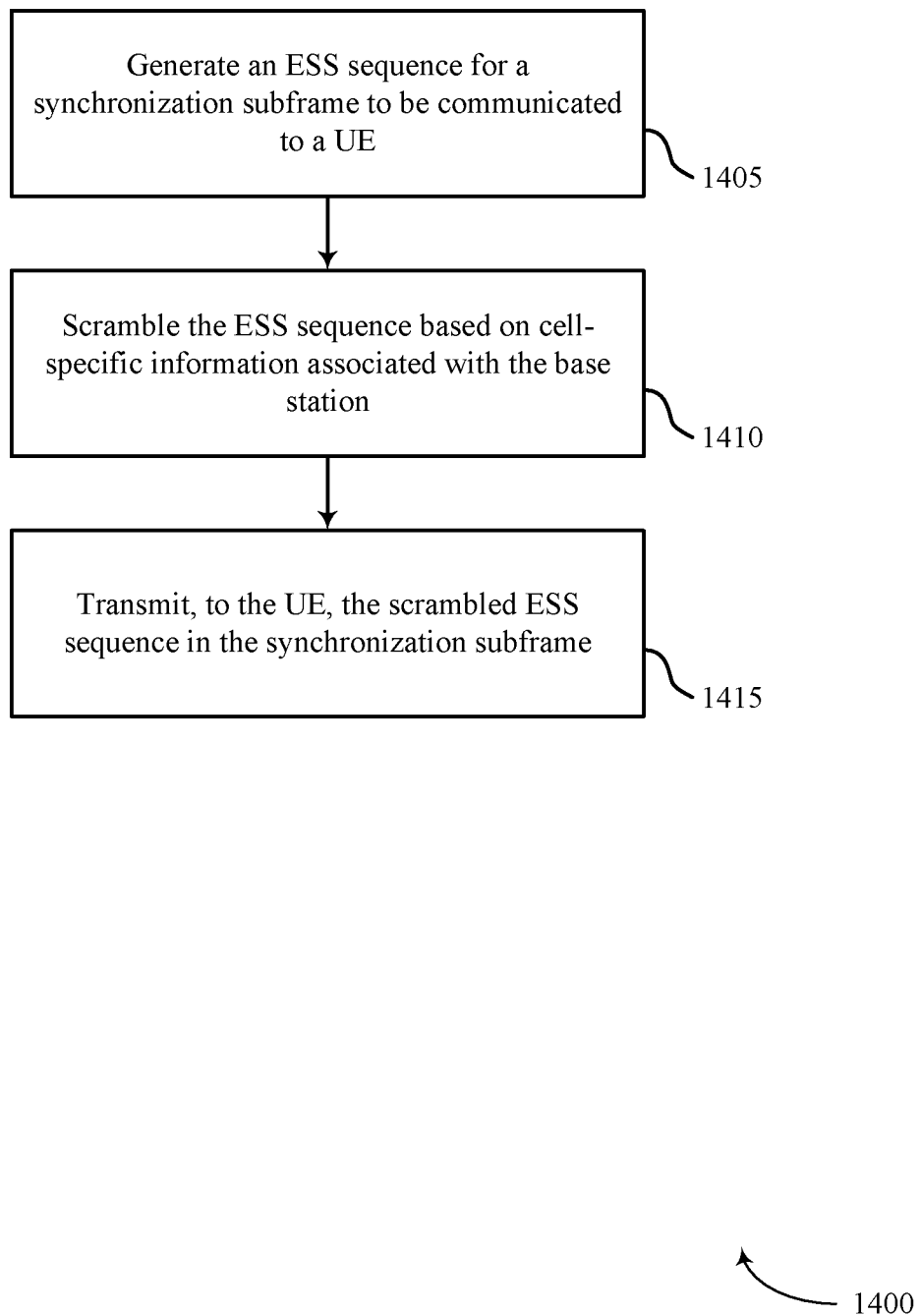

FIG. 14 shows a flowchart illustrating a method 1400 for synchronization signal optimizations for symbol index detection in accordance with various aspects of the present disclosure. The operations of method 1400 may be implemented by a device such as a base station 105 or its components as described with reference to FIGS. 1 and 2. For example, the operations of method 1400 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1405, the base station 105 may generate an ESS sequence for a synchronization subframe to be communicated to a UE as described above with reference to FIGS. 1 through 2. In certain examples, the operations of block 1405 may be performed by the ESS component as described with reference to FIGS. 4 and 5.

At block 1410, the base station 105 may scramble the ESS sequence based on cell-specific information associated with the base station as described above with reference to FIGS. 1 through 2. In certain examples, the operations of block 1410 may be performed by the scrambling component as described with reference to FIGS. 4 and 5.

At block 1415, the base station 105 may transmit, to the UE, the scrambled ESS sequence in the synchronization subframe as described above with reference to FIGS. 1 through 2. In certain examples, the operations of block 1415 may be performed by the synchronization subframe component as described with reference to FIGS. 4 and 5.

Figure 15:
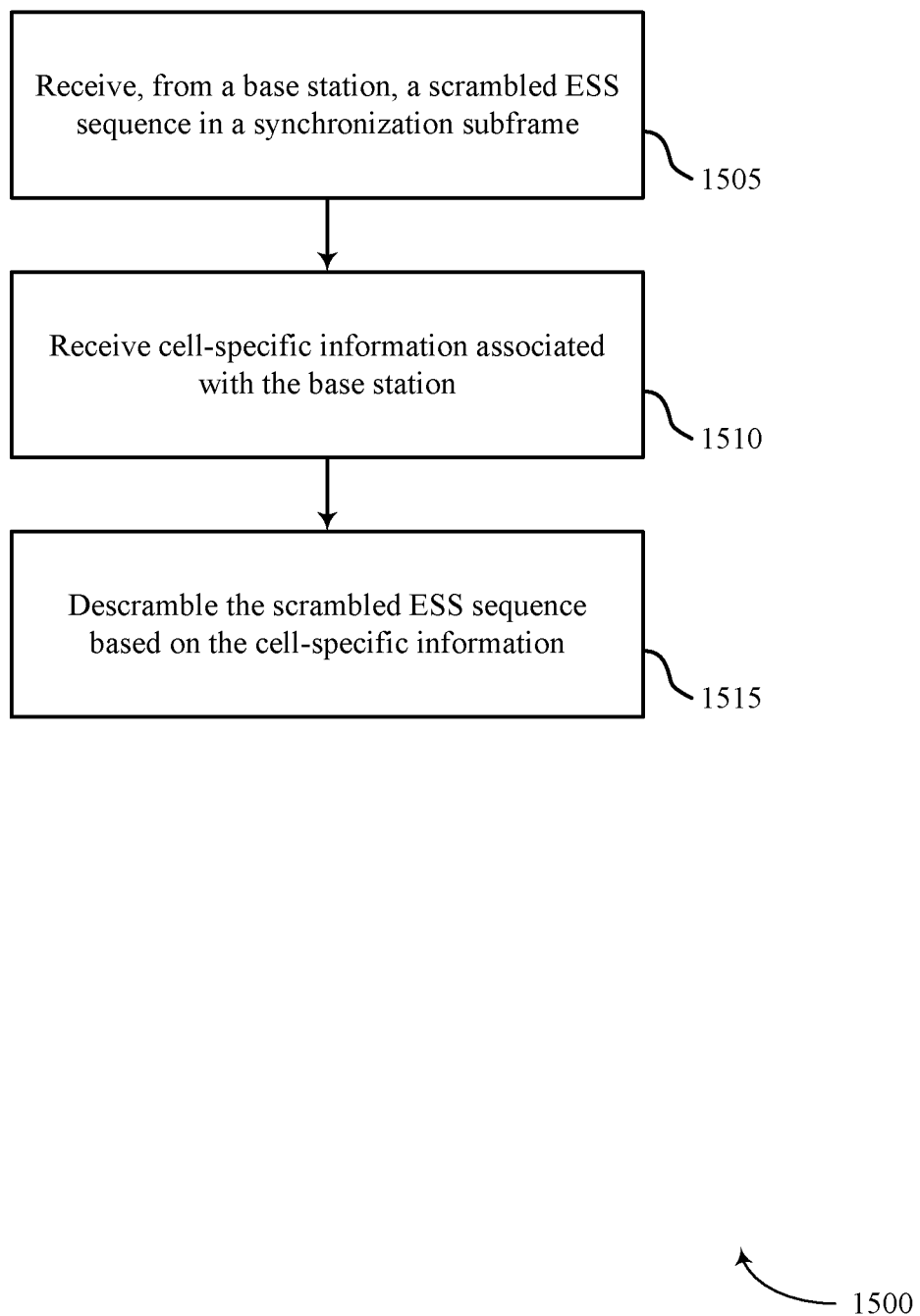

FIG. 15 shows a flowchart illustrating a method 1500 for synchronization signal optimizations for symbol index detection in accordance with various aspects of the present disclosure. The operations of method 1500 may be implemented by a device such as a UE 115 or its components as described with reference to FIGS. 1 and 2. For example, the operations of method 1500 may be performed by the UE synchronization manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive, from a base station, a scrambled ESS sequence in a synchronization subframe as described above with reference to FIGS. 1 through 2. In certain examples, the operations of block 1505 may be performed by the ESS component as described with reference to FIGS. 8 and 9.

At block 1510, the UE 115 may receive cell-specific information associated with the base station as described above with reference to FIGS. 1 through 2. In certain examples, the operations of block 1510 may be performed by the cell information component as described with reference to FIGS. 8 and 9.

At block 1515, the UE 115 may descramble the scrambled ESS sequence based on the cell-specific information as described above with reference to FIGS. 1 through 2. In some cases, the descrambled ESS sequence may be used to verify the cell-specific information. Further, the UE 115 may identify a subframe index value for the synchronization subframe based on the descrambled ESS sequence. In certain examples, the operations of block 1515 may be performed by the descrambling component as described with reference to FIGS. 8 and 9.

Figure 16:
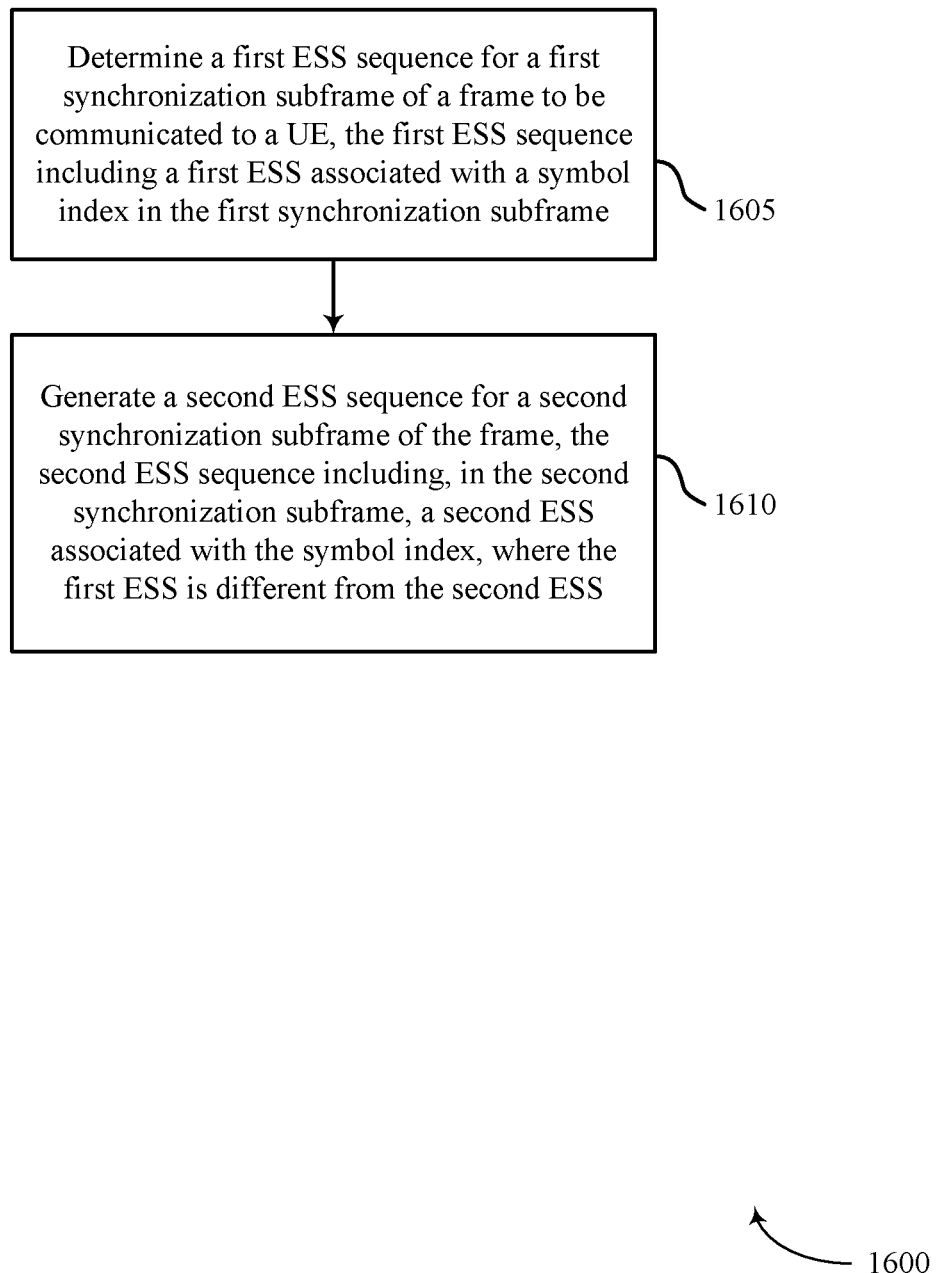

FIG. 16 shows a flowchart illustrating a method 1600 for synchronization signal optimizations for symbol index detection in accordance with various aspects of the present disclosure. The operations of method 1600 may be implemented by a device such as a base station 105 or its components as described with reference to FIGS. 1 and 2. For example, the operations of method 1600 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may determine a first ESS sequence for a first synchronization subframe of a frame to be communicated to a UE, the first ESS sequence including a first ESS associated with a symbol index in the first synchronization subframe as described above with reference to FIGS. 1 through 2. In certain examples, the operations of block 1605 may be performed by the ESS component as described with reference to FIGS. 4 and 5.

At block 1610, the base station 105 may generate a second ESS sequence for a second synchronization subframe of the frame, the second ESS sequence including, in the second synchronization subframe, a second ESS associated with the symbol index, where the first ESS is different from the second ESS as described above with reference to FIGS. 1 through 2. In certain examples, the operations of block 1610 may be performed by the ESS component as described with reference to FIGS. 4 and 5.

Figure 17:
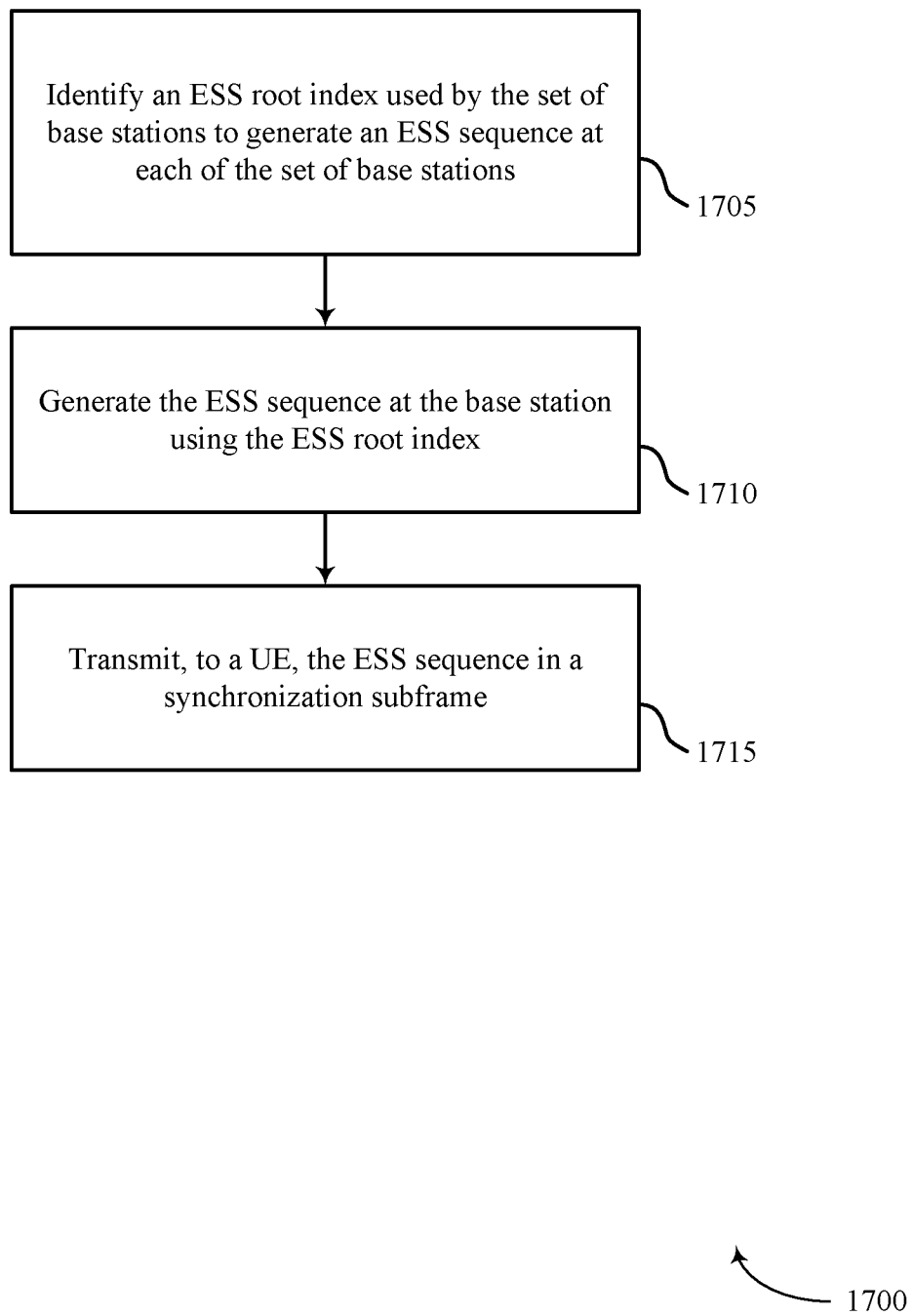

FIG. 17 shows a flowchart illustrating a method 1700 for synchronization signal optimizations for symbol index detection in accordance with various aspects of the present disclosure. The operations of method 1700 may be implemented by a device such as a base station 105 or its components as described with reference to FIGS. 1 and 2. For example, the operations of method 1700 may be performed by the base station synchronization manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may identify an ESS root index used by the set of base stations to generate an ESS sequence at each of the set of base stations as described above with reference to FIGS. 1 through 2. In certain examples, the operations of block 1705 may be performed by the root index component as described with reference to FIGS. 4 and 5.

At block 1710, the base station 105 may generate the ESS sequence at the base station using the ESS root index as described above with reference to FIGS. 1 through 2. In certain examples, the operations of block 1710 may be performed by the ESS component as described with reference to FIGS. 4 and 5.

At block 1715, the base station 105 may transmit, to a UE, the ESS sequence in a synchronization subframe as described above with reference to FIGS. 1 through 2. In certain examples, the operations of block 1715 may be performed by the synchronization subframe component as described with reference to FIGS. 4 and 5.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for synchronization signal optimizations for symbol index detection.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA, UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for synchronization signal optimizations for symbol index detection. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving, from a base station, an extended synchronization signal sequence for a physical broadcast channel in a synchronization subframe;
receiving cell-specific information associated with the base station;
identifying a pseudo-random sequence based at least in part on the cell-specific information; and
descrambling the extended synchronization signal sequence based at least in part on the pseudo-random sequence and a length associated with the extended synchronization signal sequence.

2. The method of claim 1, further comprising:
identifying a symbol index of the synchronization subframe based at least in part on the descrambling.

3. The method of claim 1, further comprising:
verifying cell-specific information associated with the base station based at least in part on the descrambling.

4. The method of claim 1, wherein the extended synchronization signal sequence is descrambled based at least in part on a sequence $$r(n) = \frac{1}{\sqrt{2}}(1 - 2 \cdot c(2n)) + j\frac{1}{\sqrt{2}}(1 - 2 \cdot c(2n+1)),$$

$$n = 0, 1, \ldots, N-1$$

wherein N represents a length associated with the extended synchronization signal sequence and (c(i), i =0, . . . , 2N+1) represents the identified pseudo-random sequence.

5. The method of claim 1, wherein the extended synchronization signal sequence is descrambled based at least in part on the synchronization subframe.

6. The method of claim 5, further comprising:
identifying a synchronization subframe number of the synchronization subframe based at least in part on the descrambling.

7. The method of claim 1, further comprising:
identifying a subframe index value for the first synchronization subframe based at least in part on the descrambling.

8. The method of claim 1, wherein the cell-specific information comprises a cell identifier or virtual cell identifier of the base station.

9. The method of claim 1, further comprising:
receiving, from a second base station, a second scrambled extended synchronization signal sequence; and
determining that an attempt to descramble the second scrambled extended synchronization signal sequence has failed based at least in part on the cell-specific information.

10. The method of claim 1, further comprising:
decoding a physical broadcast channel message based at least in part on the descrambling.

11. An apparatus for wireless communication comprising:
a processor,
memory in electronic communication with the processor; and
instructions stored in the memory and executable by the processor to cause the apparatus to:
receive, from a base station, an extended synchronization signal sequence for a physical broadcast channel in a synchronization subframe;
receive cell-specific information associated with the base station;
identify a pseudo-random sequence based at least in part on the cell-specific information; and
descramble the extended synchronization signal sequence based at least in part on the pseudo-random sequence and a length associated with the extended synchronization signal sequence.

12. The apparatus of claim 11, wherein the instructions are further executable by the processor to cause the apparatus to:
identify a symbol index of the synchronization subframe based at least in part on the descrambling.

13. The apparatus of claim 11, wherein the instructions are further executable by the processor to cause the apparatus to:
verify cell-specific information associated with the base station based at least in part on the descrambling.

14. The apparatus of claim 11, wherein the extended synchronization signal sequence is descrambled based at least in part on a sequence $$r(n) = \frac{1}{\sqrt{2}}(1 - 2 \cdot c(2n)) + j\frac{1}{\sqrt{2}}(1 - 2 \cdot c(2n+1)),$$

$$n = 0, 1, \ldots, N-1$$

wherein N represents a length associated with the extended synchronization signal sequence and (c(i), i =0, . . . , 2N+1) represents the identified pseudo-random sequence.

15. The apparatus of claim 11, wherein the extended synchronization signal sequence is descrambled based at least in part on the synchronization subframe.

16. The apparatus of claim 15, wherein the instructions are further executable by the processor to cause the apparatus to:

identify a synchronization subframe number of the synchronization subframe based at least in part on the descrambling.

17. The apparatus of claim 11, wherein the instructions are further executable by the processor to cause the apparatus to:
identify a subframe index value for the first synchronization subframe based at least in part on the descrambling.

18. The apparatus of claim 11, wherein the cell-specific information comprises a cell identifier or virtual cell identifier of the base station.

19. The apparatus of claim 11, wherein the instructions are further executable by the processor to cause the apparatus to:
receive, from a second base station, a second scrambled extended synchronization signal sequence; and
determine that an attempt to descramble the second scrambled extended synchronization signal sequence has failed based at least in part on the cell-specific information.

20. The apparatus of claim 11, wherein the instructions are further executable by the processor to cause the apparatus to:
decode a physical broadcast channel message based at least in part on the descrambling.

21. A non-transitory computer-readable medium storing code, the code comprising instructions executable by a processor to:
receive, from a base station, an extended synchronization signal sequence for a physical broadcast channel in a synchronization subframe;
receive cell-specific information associated with the base station;
identify a pseudo-random sequence based at least in part on the cell-specific information; and
descramble the extended synchronization signal sequence based at least in part on the pseudo-random sequence and a length associated with the extended synchronization signal sequence.

* * * * *